(12) United States Patent
Sakamoto et al.

(10) Patent No.: US 12,514,721 B2
(45) Date of Patent: Jan. 6, 2026

(54) STENT DELIVERY SYSTEM, CONTROL APPARATUS, AND METHOD

(71) Applicant: OLYMPUS CORPORATION, Tokyo (JP)

(72) Inventors: Yuji Sakamoto, Kunitachi (JP); Genri Inagaki, Fuchu (JP); Nao Inoue, Isehara (JP); Shohei Hemmi, Tokyo (JP); Kenji Murakami, Hino (JP)

(73) Assignee: OLYMPUS CORPORATION, Tokyo (JP)

( * ) Notice: Subject to any disclaimer, the term of this patent is extended or adjusted under 35 U.S.C. 154(b) by 290 days.

(21) Appl. No.: 18/197,889

(22) Filed: May 16, 2023

(65) Prior Publication Data

US 2023/0404784 A1 Dec. 21, 2023

Related U.S. Application Data

(60) Provisional application No. 63/347,227, filed on May 31, 2022, provisional application No. 63/343,251, filed on May 18, 2022.

(51) Int. Cl.
*A61F 2/95* (2013.01)
*A61B 90/00* (2016.01)
*G16H 20/40* (2018.01)
*G16H 50/70* (2018.01)

(52) U.S. Cl.
CPC ............. *A61F 2/95* (2013.01); *A61B 90/37* (2016.02); *G16H 20/40* (2018.01); *G16H 50/70* (2018.01); *A61F 2250/0098* (2013.01)

(58) Field of Classification Search
CPC ......... A61F 2/966; A61B 90/37; G16H 20/40; G16H 30/20; G16H 30/40; G16H 40/67; G16H 50/20; G16H 50/30; G16H 50/50; G16H 50/70
See application file for complete search history.

(56) References Cited

U.S. PATENT DOCUMENTS

| 6,302,893 | B1 | 10/2001 | Limon et al. | |
| 2016/0022208 | A1* | 1/2016 | Gopinath | A61B 5/02154 |
| | | | | 600/427 |
| 2022/0000556 | A1* | 1/2022 | Casey | A61F 2/4455 |
| 2022/0338929 | A1* | 10/2022 | Goyal | G16H 50/50 |

FOREIGN PATENT DOCUMENTS

| JP | 2018-505728 A | 3/2018 |
| WO | 2016/116821 A1 | 7/2016 |
| WO | WO-2021193019 A1 * | 9/2021 |

OTHER PUBLICATIONS

English Translation of Description of WO 2021/193019 A1 (Iguchi et al.) from Patentscope website <https://patentscope.wipo.int/search/en/detail.jsf?docId=WO2021193019>, accessed Apr. 24, 2025 (Year: 2025).*

* cited by examiner

*Primary Examiner* — Diane D Yabut
(74) *Attorney, Agent, or Firm* — Scully, Scott, Murphy & Presser, P.C.

(57) ABSTRACT

A stent delivery system includes: a stent delivery device configured to carry a stent to a stenosis and indwell the stent, an observation device configured to observe the stenosis, and one or more processors comprising hardware, the one or more processors being configured to: acquire an observation image from the observation device, and determine at least one stent candidate to be placed in the stenosis based on the observation image.

17 Claims, 33 Drawing Sheets

FIG. 12

DATABASE M22

| CASE ID | PREOPERATIVE INFORMATION ||| CHARACTERISTICS OF STENOSIS ||| TYPES OF STENTS USED |
|---|---|---|---|---|---|---|---|
| | TARGET ORGAN | AGE | PHYSIQUE | STENOSIS POSITION | STENOSIS SHAPE | OTHER FEATURES | |
| 0001 | BILE DUCT | 64 | SKINNY | LIVER SIDE | CURVED | NOTHING SPECIAL | WIRE STENT (FENCE WEAVE) |
| 0002 | BILE DUCT | 53 | STANDARD | PAPILLA SIDE | LINEAR | WET | COVER STENT |
| 0003 | BILE DUCT | 47 | OVERWEIGHT | LIVER SIDE | CURVED | NOTHING SPECIAL | PLASTIC STENT BENT STENT |
| 0004 | BILE DUCT | 50 | STANDARD | PAPILLA SIDE | LINEAR | NOTHING SPECIAL | WIRE STENT (BRAID WEAVE) |

FIG. 13

- BENT STENT — DEGREE OF FITTABILTY F: 200
- WIRE STENT — DEGREE OF FITTABILTY F: 100
- COVER STENT — DEGREE OF FITTABILTY F: 50

FIG. 14

- BENT STENT — NUMBER OF SIMILAR CASES: 35
- WIRE STENT — NUMBER OF SIMILAR CASES: 10
- COVER STENT — NUMBER OF SIMILAR CASES: 5

STENT DELIVERY SYSTEM, CONTROL APPARATUS, AND METHOD

CROSS-REFERENCE TO RELATED APPLICATIONS

The present application claims priority based on U.S. Patent Provisional Application No. 63/343,251 provisionally filed in the United States on May 18, 2022, and U.S. Patent Provisional Application No. 63/347,227 provisionally filed in the United States on May 31, 2022, the contents of each of which are incorporated herein by reference.

BACKGROUND

The present disclosure relates to a stent delivery system, a control apparatus, and an method.

A stent delivery device is used when a self-expanding stent is placed in a stenosis or occlusion (hereinafter referred to as "stenosis, etc.") that occurs in a lumen.

In a stent delivery device, a stent is housed in a gap between an inner sheath and an outer sheath, and the stent is exposed and expanded by retracting the outer sheath with respect to the inner sheath.

The stent is left in the lumen by removing the inner sheath from the stent.

SUMMARY

A stent delivery system includes: a stent delivery device configured to carry a stent to a stenosis and indwell the stent; an observation device configured to observe the stenosis, and one or more processors comprising hardware, the one or more processors being configured to: acquire an observation image from the observation device, and determine at least one stent candidate to be placed in the stenosis based on the observation image.

A control apparatus comprising: one or more processors comprising hardware, the one or more processors being configured to: acquires an observation image from an observation device that observes a stenosis, and determine at least one stent candidate to be placed in the stenosis based on the observation image.

A method comprising: acquiring an observation image from an observation device that observes the stenosis, and determining at least one stent candidate to be placed in a stenosis based on the observation image.

According to the stent delivery system, the control apparatus, and the method of the present disclosure, an optimum stent can be selected according to the shape and position of stenosis or the like.

BRIEF DESCRIPTION OF THE DRAWINGS

FIG. 12 is a diagram showing a database of the database model.
FIG. 13 is a diagram showing proposed stent candidates.
FIG. 14 is a diagram showing proposed stent candidates.

DETAILED DESCRIPTION

First Embodiment

Figure 1:
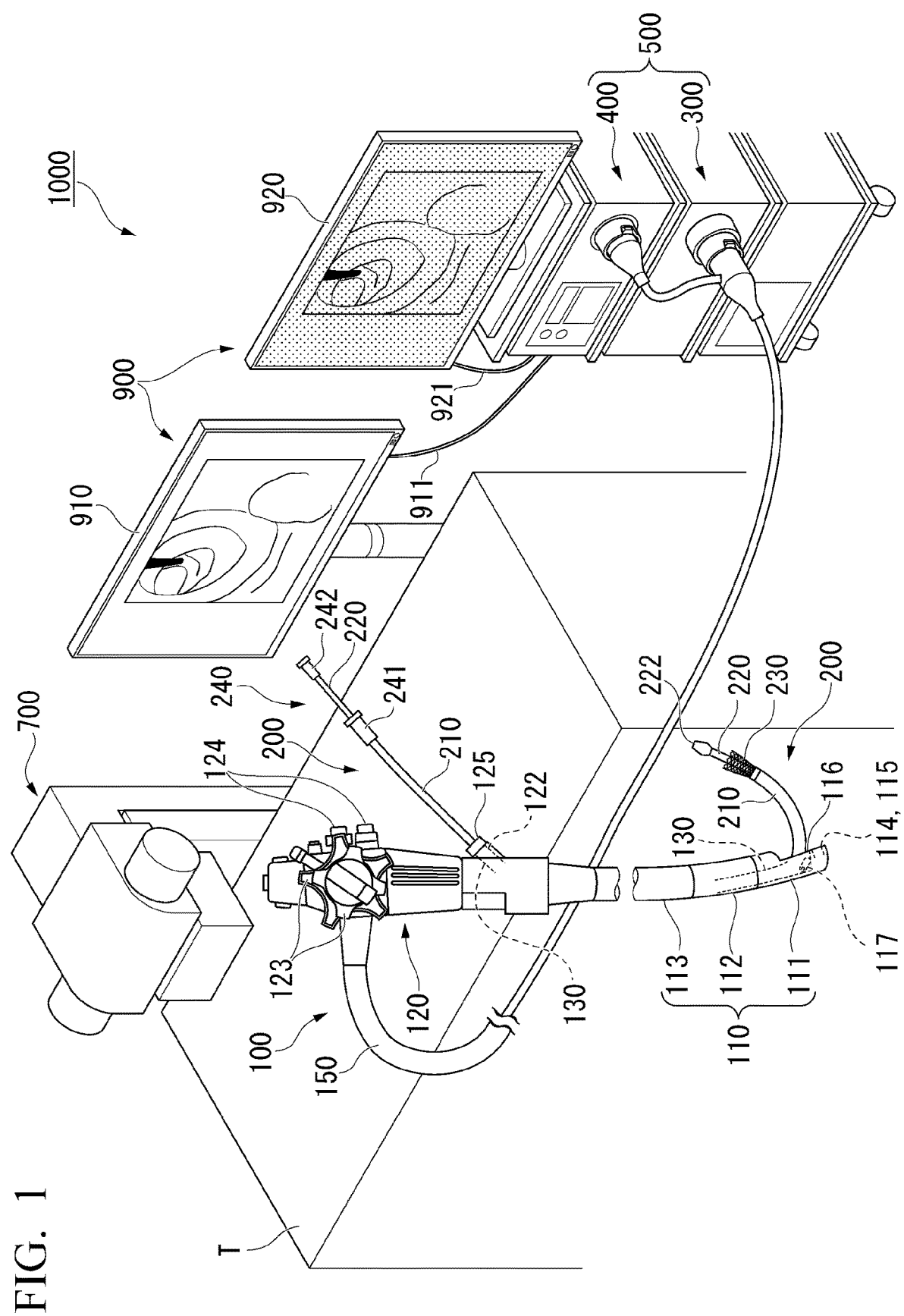
FIG. 1 is a diagram showing the overall configuration of an endoscope system according to a first embodiment.

An endoscope system 1000 according to the first embodiment of the present disclosure will be described with reference to FIGS. 1 to 15. FIG. 1 is a diagram showing the overall configuration of the endoscope system 1000.

Endoscope System 1000

The endoscope system (stent delivery system) 1000 is a medical system for observing and treating the inside of a patient's body. The endoscope system 1000 includes an endoscope 100, a stent delivery device 200, a driving device 300, a video control device 400, an observation device 700, and a display device 900.

The endoscope 100 is a device that is inserted into a patient's lumen to observe and treat an affected area. The endoscope 100 is connected to the driving device 300 and the video control device 400 via a universal cord 150.

The stent delivery device 200 is a device that is inserted into the treatment instrument channel 130 of the endoscope 100 as shown in FIG. 1 to leave a stent 230 in the patient's lumen.

The driving device 300 is connected to the endoscope 100 via the universal cord 150. The driving device 300 drives a built-in pump or the like based on an operation input to an operation portion 120 of the endoscope 100 to cause the endoscope 100 to perform air supply and suction.

The video control device 400 is detachably connected to a video control cable 670. The video control device 400 is connected to the endoscope 100 via the universal cord 150 and acquires captured images from the endoscope 100. The video control device 400 causes the display device 900 to display captured images acquired from the endoscope 100 and GUI images and CG images for the purpose of providing information to the operator.

The driving device 300 and the video control device 400 constitute a control device 500 that controls the endoscope system 1000. The controller 500 may further include peripherals such as a video printer. The driving device 300 and the video control device 400 may be an integrated device.

The observation device 700 is a known X-ray fluoroscopy device that emits X-rays from outside the body to observe a patient. The observation device 700 may include a device for observing a patient by CT (Computed Tomography) or MRI (Magnetic Resonance Imaging). The observation device 700 is connected to the video control device 400 via a connection cable (not shown). Note that the observation device 700 is not limited to the device shown in FIG. 1.

The display device 900 includes an endoscope image display device 910 and an observation image device 920. The endoscope image display device 910 is a device capable of displaying images such as an LCD. The endoscope image display device 910 is connected to the video control device 400 via a display cable 911. The observation image device 920 is a device capable of displaying an X-ray image. The observation image device 920 is connected to the video control device 400 via a display cable 921. When the observation device 700 includes a device for observing a patient by CT or MRI, the observation image device 920 includes a device capable of displaying CT images and MRI images.

Next, each device of the endoscope system 1000 will be described in detail.

Endoscope 100

The endoscope 100 is a known side-viewing flexible endoscope, and includes a long insertion portion 110, an operation portion 120 provided at the proximal end of the insertion portion 110, and the universal cord 150 extending from the operation portion 120. Note that the endoscope 100 may be a direct-view flexible endoscope.

The insertion portion 110 includes a distal end rigid portion 111 provided at the distal end, a bending portion 112 provided on the proximal side of the distal end rigid portion 111 and capable of a bending operation, and a flexible tube portion 113 provided on the proximal end side of the bending portion 112. The insertion portion 110 is formed with a treatment instrument channel 130 through which an endoscopic treatment instrument such as the stent delivery device 200 can be inserted.

A light guide 114, an imaging unit 115 having an imaging device such as a CCD, and a distal end opening 116 communicating with the treatment instrument channel 130 are provided on the side surface of the distal end rigid portion 111.

A raising base 117 is provided near the distal end opening 116 of the distal end rigid portion 111. A proximal end portion of the raising base 117 is rotatably supported by the distal end rigid portion 111. A raising base operation wire (not shown) fixed to the distal end of the raising base 117 extends through the insertion portion 110 to the operation portion 120.

The bending portion 112 can be bent vertically and horizontally. The distal end of the operation wire is fixed to the distal end side of the bending portion 112. The operation wire extends through the insertion portion 110 to the operation portion 120.

The operation portion 120 is provided with a knob 123 for operating the operation wire and the raising base operation wire, and a switch 124 for operating the imaging unit 115 and the like. The operator can bend the bending portion 112 in a desired direction by operating the knob 123.

The operation portion 120 is provided with a forceps opening (proximal end opening) 122 that communicates with the treatment instrument channel 130. The operator can insert an endoscopic instrument such as the stent delivery device 200 through the forceps port 122. A forceps plug 125 is attached to the forceps port 122 to prevent leakage of bodily fluids.

The universal cord 150 connects the endoscope 100 to the control device 500. An imaging signal imaged by the imaging unit 115 is transmitted to the video control device 400 via the universal cord 150.

Stent Delivery Device 200

Figure 2:
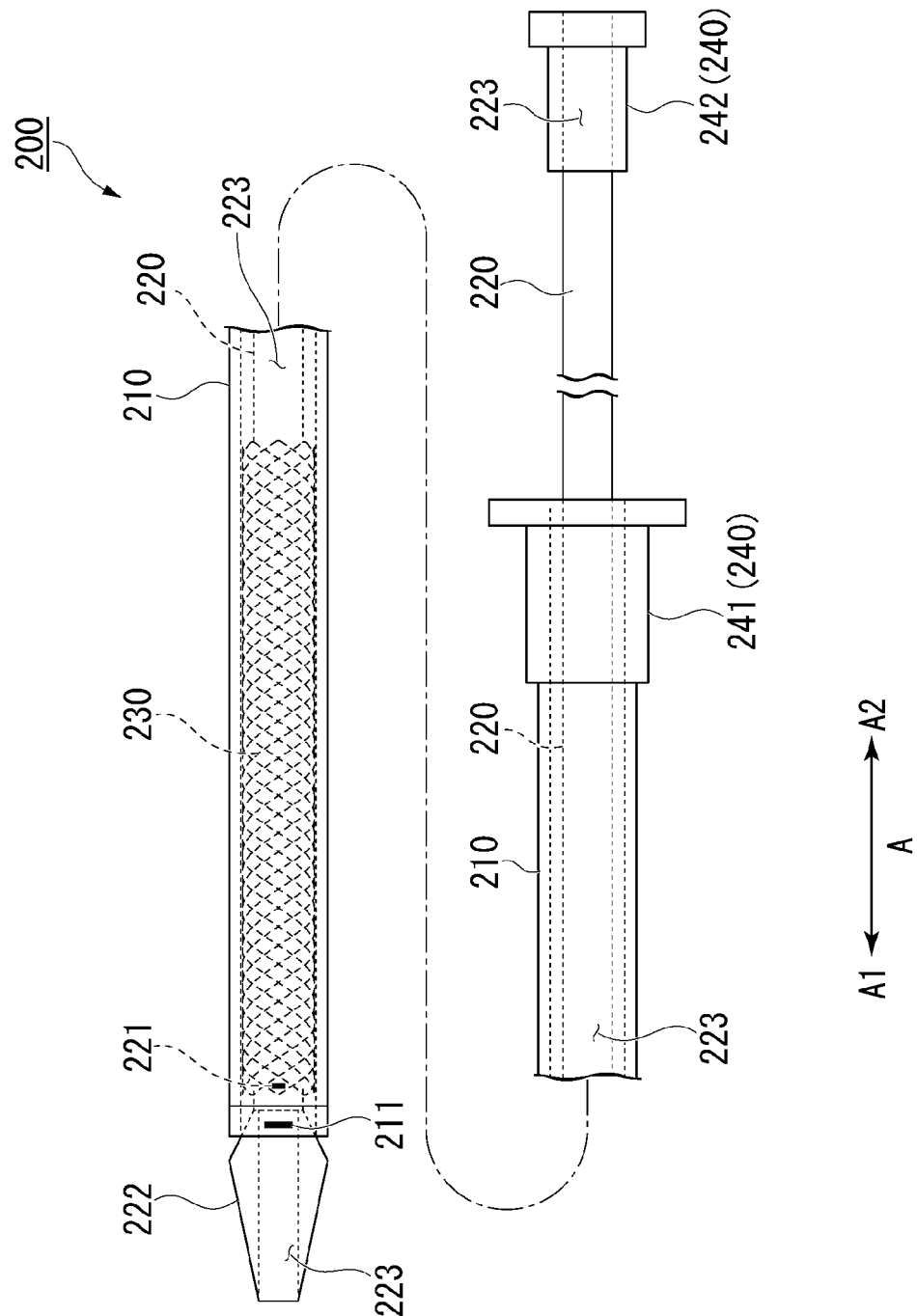
FIG. 2 is a diagram showing a stent delivery device of the endoscope system.

FIG. 2 shows a stent delivery device 200.

The stent delivery device 200 is elongated as a whole and includes an outer tubular member 210, an inner tubular member 220, a stent 230, and an operation portion 240.

In the following description, the side on which the stent delivery device 200 is inserted into the lumen of the patient P in the longitudinal direction A is referred to as the "distal end side (distal side) A1", and the side of the operation portion 240 is referred to as the "proximal end side (proximal side) A2".

The outer cylindrical member 210 is formed of resin or the like in a cylindrical shape and has flexibility. The outer cylinder member 210 can be inserted through the treatment instrument channel 130 of the endoscope 100. An outer tube marker 211 that is an X-ray opaque metal marker is provided at the distal end portion of the outer tube member 210.

The inner cylinder member 220 has an outer diameter smaller than the inner diameter of the outer cylinder member 210 and can be passed through the internal space (lumen) of the outer cylinder member 210. The inner cylindrical member 220 is made of resin or the like and has flexibility. A distal tip 222 having an outer diameter larger than that of the outer cylindrical member 210 is provided at the distal end of the inner cylindrical member 220.

The stent 230 is a medical device that is used to widen a stenosis or blockage that occurs inside a lumen from the inside. Various types of stents 230 are used, such as stents having different shapes and stents made of different materials (hereinafter also referred to as "stent types"). For example, the stent 230 is classified into various stent types, such as a plastic stent made of plastic and a wire stent made of metal wire. The wire stents are classified into more detailed stent types according to how the wires are woven (fence-weaving, braid-weaving, etc.). Also, a stent in which a cover is attached to at least part of a wire stent is classified as a covered stent. Furthermore, the stent 230 is classified into various types of stents according to the shape to be formed, such as a stent formed in a straight shape and a stent formed in a curved shape such as a bent stent with a curvature.

The stent 230 shown in FIG. 2 is a cylindrical self-expanding stent, and is a wire stent formed by weaving wires. The stent 230 is accommodated in the gap between the outer tubular member 210 and the inner tubular member 220 in a state in which the inner tubular member 220 is passed through the inner tubular member 220 and the diameter of the stent 230 is reduced. The stent 230 is locked by a locking portion 221 formed on the outer peripheral surface of the inner tubular member 220. As a result, the stent 230 is positioned relative to the inner cylinder member 220 in a reduced diameter state, and does not move in the longitudinal direction A relative to the inner cylinder member 220.

The operation portion 240 is provided on the proximal end side A2 of the outer cylinder member 210 and the inner cylinder member 220, and is capable of moving the outer cylinder member 210 relative to the inner cylinder member 220 in the longitudinal direction A. The operation portion 240 has an outer cylinder operation portion 241 that drives the outer cylinder member 210 and an inner cylinder operation portion 242 that drives the inner cylinder member 220.

The operator can place the stent 230 by exposing the accommodated stent 230 by moving the outer tube operation portion 241 to the proximal end side A2 with respect to the inner tube operation portion 242. The operator can also recapture the stent 230 by moving the outer tube operation portion 241 toward the distal end side A1 with respect to the inner tube operation portion 242.

A guide wire lumen 223 through which the guide wire GW is inserted is formed from the distal tip 222 to the inner cylinder operation portion 242 of the operation portion 240 via the inner cylinder member 220.

Driving Device 300

Figure 3:
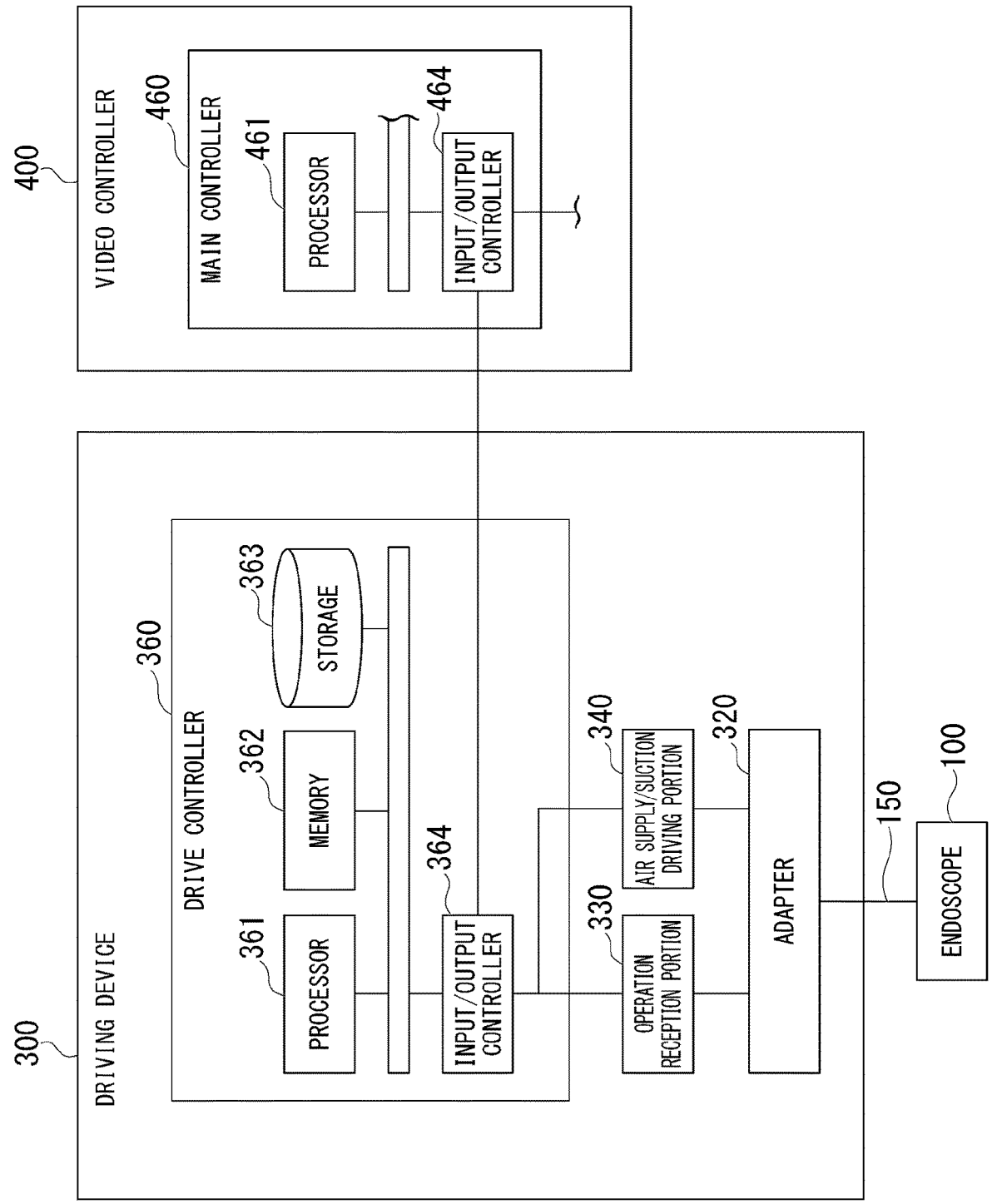
FIG. 3 is a functional block diagram of a driving device of the endoscope system.

FIG. 3 is a functional block diagram of the driving device 300.

The driving device 300 has an adapter 320, an operation reception portion 330, an air supply/suction driving portion 340, and a drive controller 360.

The adapter 320 is an adapter to which the universal cord 150 of the endoscope 100 is detachably connected.

The operation reception portion 330 receives operation input from the operation portion 120 of the endoscope 100 via the universal cord 150.

The air supply/suction driving portion 340 is connected to an air supply/suction tube through which the universal cord 150 is inserted. The air supply/suction driving portion 340 includes a pump or the like, and supplies air or liquid to the air supply/suction tube. Also, the air supply/suction driving portion 340 sucks air from the air supply/suction tube.

The drive controller 360 controls the driving device 300 as a whole. The drive controller 360 acquires the operation input received by the operation reception portion 330. The drive controller 360 controls the air supply/suction driving portion 340 based on the acquired operation input or the like.

The drive controller 360 includes a processor 361, a memory 362, a storage portion 363 capable of storing programs and data, and an input/output control portion 364. The drive controller 360 is a programmable computer. The functions of the drive controller 360 are implemented by the processor 361 executing programs. At least some functions of the drive controller 360 may be realized by dedicated logic circuits.

The input/output control portion 364 is connected to the operation reception portion 330, the air supply/suction driving portion 340, the video control device 400, the input device (not shown), and the network device (not shown). Under the control of the processor 361, the input/output control portion 364 transmits and receives data and control signals to and from connected devices.

The drive controller 360 may further have components other than the processor 361, the memory 362, the storage portion 363, and the input/output control portion 364. For example, the drive controller 360 may further include an image calculation portion that performs some or all of the image processing and image recognition processing. By further having an image calculation portion, the drive controller 360 can execute specific image processing and image recognition processing at high speed. The image calculation portion may be mounted in a separate hardware device connected via a communication line.

Video Control Device 400

Figure 4:
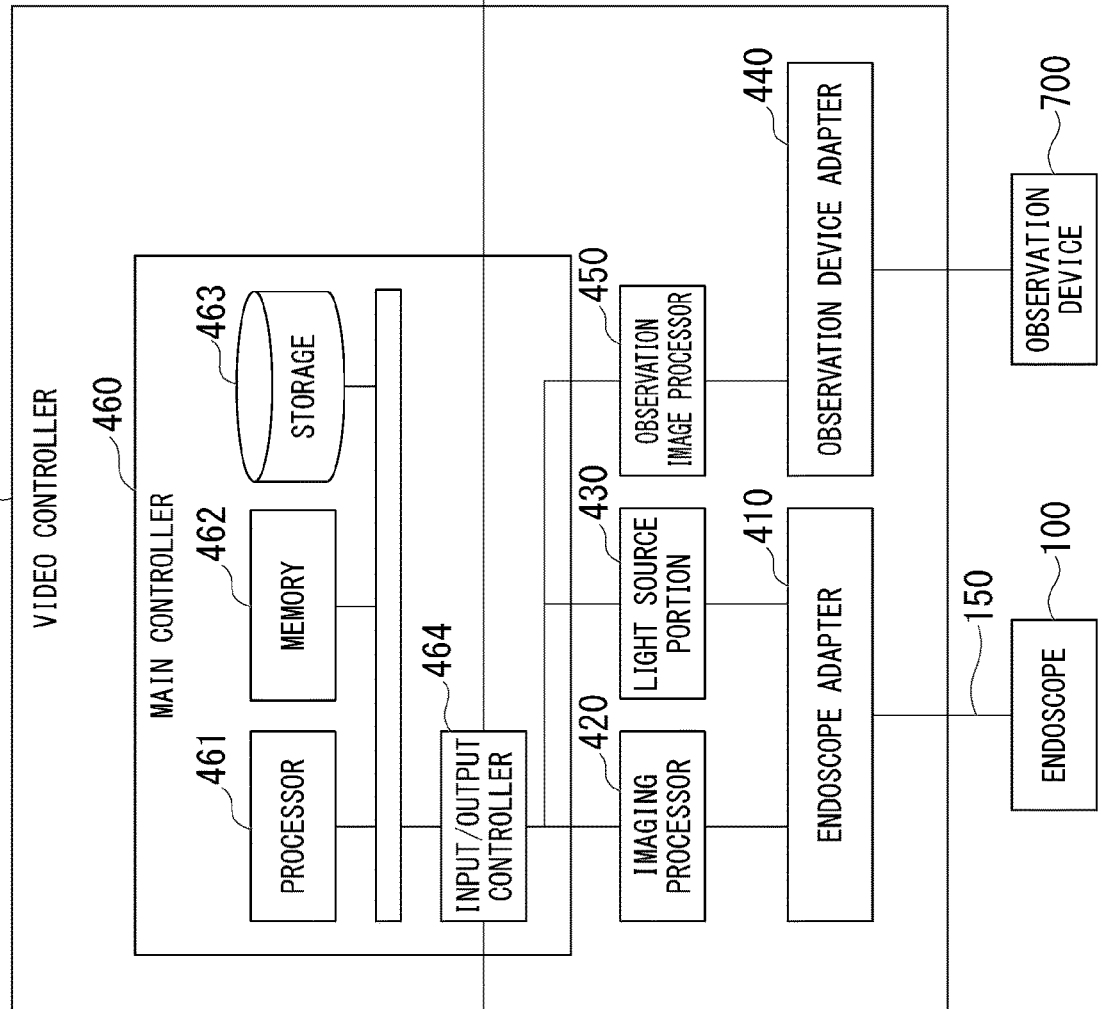
FIG. 4 is a functional block diagram of a video control device of the endoscope system.

FIG. 4 is a functional block diagram of the video control device 400.

The video control device 400 includes an endoscope adapter 410, an imaging processing portion 420, a light source portion 430, an observation device adapter 440, an observation image processing portion 450, and a main controller 460.

The endoscope adapter 410 is an adapter to which the universal cord 150 of the endoscope 100 is detachably connected.

The imaging processing portion 420 acquires imaging signals from the imaging unit 115 of the endoscope 100 via the universal cord 150. The imaging processing portion 420 converts the acquired imaging signal into a captured image.

The light source portion 430 is connected to a light cable through which the universal cord 150 is inserted. The light source portion 430 generates illumination light that irradiates the object to be imaged. The illumination light generated by the light source portion 430 is guided to the light guide 114 of the distal end rigid portion 111 of the endoscope 100 via a light cable or the like.

The observation device adapter 440 is an adapter to which a connection cable (not shown) connected to the observation device 700 is detachably connected.

The observation image processing portion 450 acquires the X-ray observation signal from the observation device 700 via the connection cable. The observation image processing portion 450 converts the acquired X-ray observation signal into an X-ray observation image. When the observation device 700 includes a device for observing a patient by CT, the observation image processing portion 450 converts the obtained CT observation signal into a CT image. When the observation device 700 includes a device for observing a patient by MRI, the observation image processing portion 450 converts the acquired MRI observation signal into an MRI image. Note that the observation device adapter 440 and the observation image processing portion 450 may be devices separated from the video control device 400.

The main controller 460 has a processor 461, a program-readable memory 462, a storage portion 463, and an input/output control portion 464. The main controller 460 is a computer capable of executing programs. The functions of the main controller 460 are implemented by the processor 461 executing programs. At least some of the functions of the main controller 460 may be realized by a dedicated logic circuit.

The storage portion 463 is a non-volatile recording medium that stores the above-described programs and necessary data. The storage portion 463 is composed of, for example, a ROM, a hard disk, or the like. A program recorded in the storage portion 463 is read into the memory 462 and executed by the processor 461.

The input/output control portion 464 is connected to the imaging processing portion 420, the light source portion 430, the observation image processing portion 450, the driving device 300, the display device 900, the input device (not shown), and network equipment (not shown). Under the control of the processor 461, the input/output control portion 464 transmits and receives data and control signals to and from connected devices.

The main controller 460 can perform image processing on the captured image acquired by the imaging processing portion 420 and the X-ray observation image acquired by the observation image processing portion 450. The main controller 460 can generate GUI images and CG images for the purpose of providing information to the operator S. The main controller 460 can control the display device 900 to display captured images, X-ray observation images, GUI images, and CG images on the display device 900.

The main controller 460 is not limited to an integrated hardware device. For example, the main controller 460 may be configured by separating a part of it as a separate hardware device and then connecting the separated hardware device with a communication line. For example, the main controller 460 may be a cloud system that connects the separated storage portions 463 with a communication line.

The main controller 460 may further have components other than the processor 461, the memory 462, the storage portion 463, and the input/output control portion 464. For example, the main controller 460 may further have an image calculation portion that performs some or all of the image processing and image recognition processing. By further having an image calculation portion, the main controller 460 can execute specific image processing and image recognition processing at high speed. The image calculation portion may be mounted in a separate hardware device connected via a communication line.

Operation of Endoscope System 1000

Figure 5:
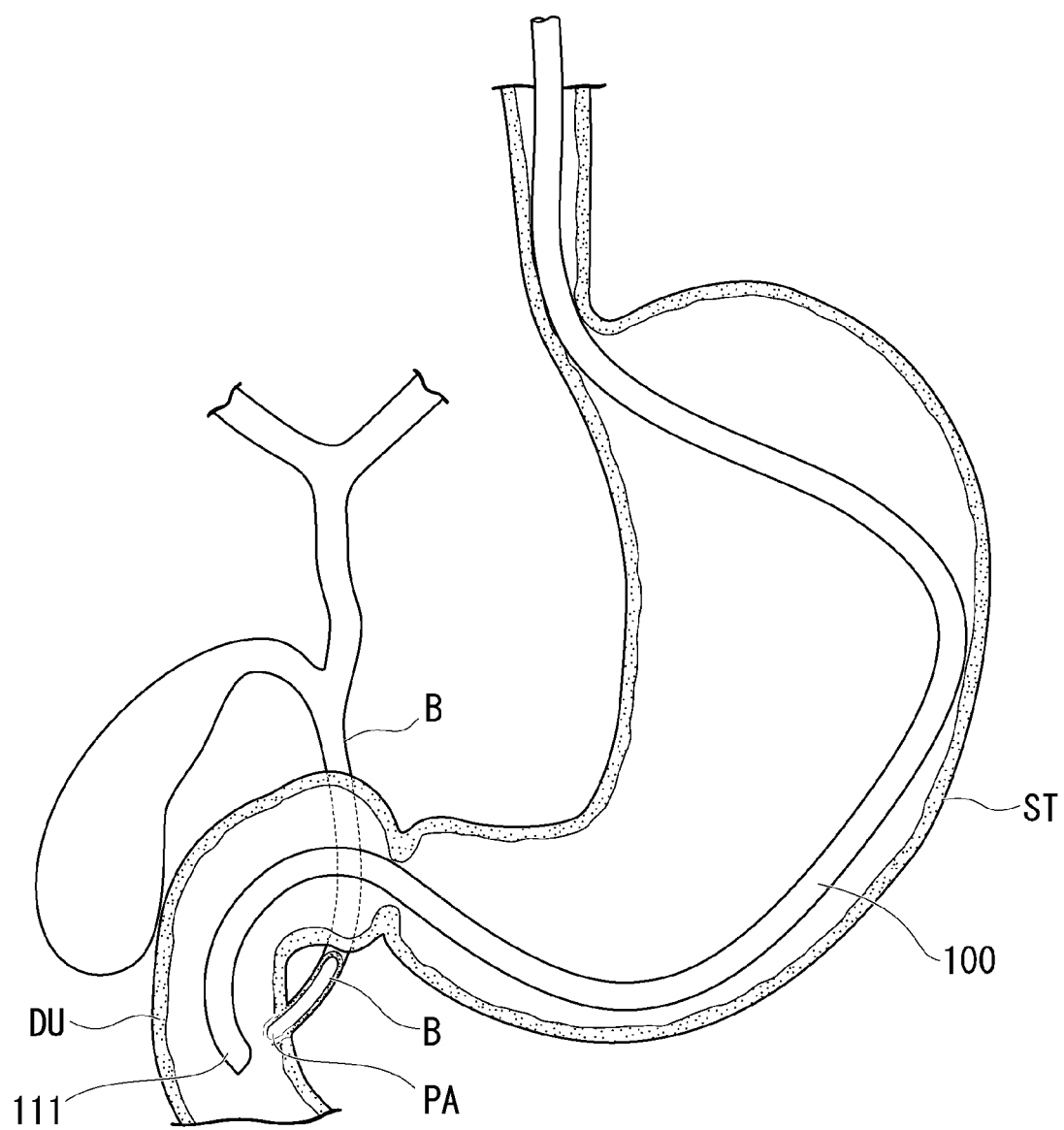
FIG. 5 is a diagram showing a bile duct in which a stent is placed.
Figure 6:
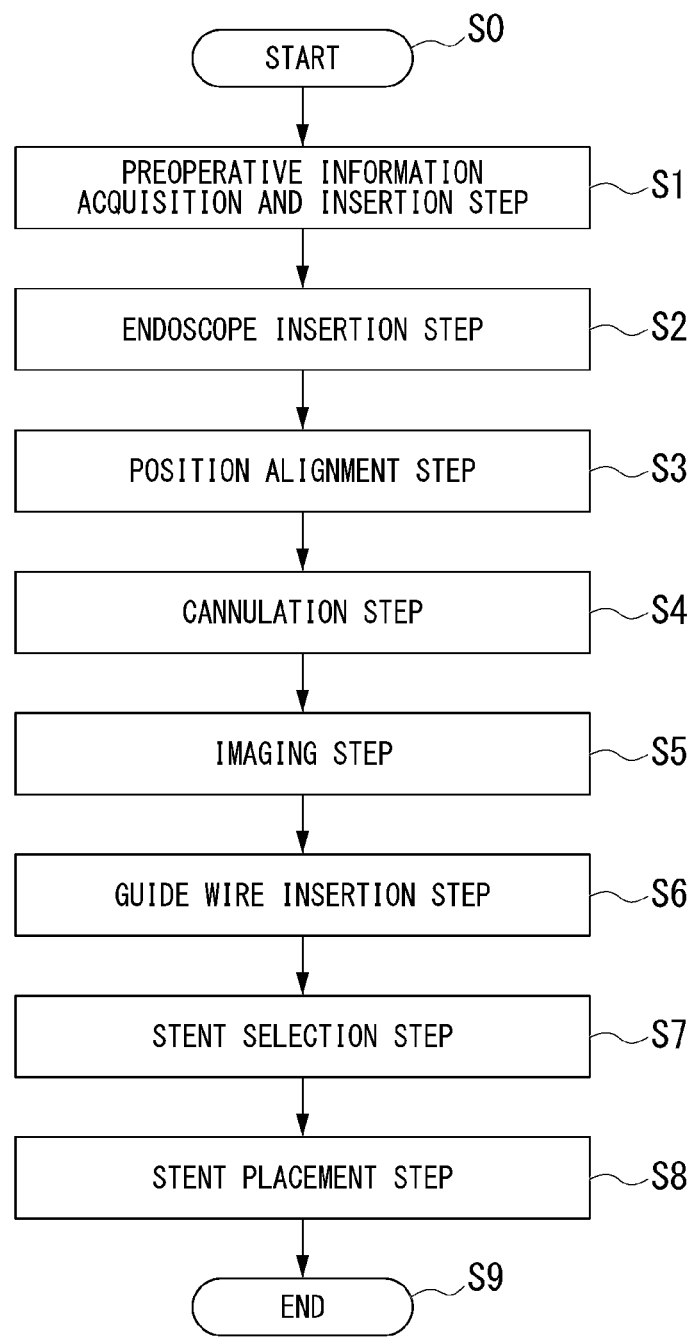
FIG. 6 is a flow chart showing the steps of the procedure.

Next, the operation of the endoscope system 1000 according to this embodiment will be described. Specifically, a procedure for placing the stent 230 in the bile duct B by endoscopic retrograde cholangiopancreatography (ERCP) will be described. FIG. 5 shows a bile duct B in which a stent 230 is placed. FIG. 6 is a flow chart showing the steps of the procedure.

Step S1: Preoperative Information Acquisition and Insertion Step

The operator uses the input device to input preoperative information regarding the procedure for placing the stent 230 into the control device 500. The preoperative information to be input includes the type of organ to be operated on, the condition of the affected area to be treated, patient information (age, body shape, etc.), and the surgical plan. The surgery plan is a plan for surgery to be performed in the future, and includes information such as whether or not the indwelling stent 230 is scheduled to be replaced in subsequent surgeries. The main controller 460 (mainly the processor 461) acquires the input preoperative information.

Step S2: Endoscope Insertion Step

In step S2, the operator inserts the insertion portion 110 of the endoscope 100 into the lumen of the patient through a natural opening such as the mouth. The operator bends the bending portion 112 by operating the knob 123 or the like as necessary. The operator inserts the distal end rigid portion 111 of the endoscope 100 into the duodenum DU.

Step S3: Position Alignment Step

In step S3, the operator adjusts the position of the distal end rigid portion 111 of the endoscope 100 so that the papilla PA is within the imaging range of the imaging unit 115 of the endoscope 100.

Step S4: Cannulation Step

The operator inserts a cannula from the papilla PA into the bile duct B in step S4. Specifically, a cannula is inserted into the treatment instrument channel 130 of the endoscope 100 to protrude from the distal end opening 116, and the cannula is inserted into the bile duct B.

Step S5 Imaging Step

In step S5, the operator injects the contrast medium into the cannula so as to cause the contrast medium to flow into the bile duct B through the cannula. The operator obtains an X-ray image showing the bile duct B and the like by performing X-ray imaging using the observation device 700. The operator acquires CT images and MRI images as necessary.

Step S6: Guide Wire Insertion Step

In step S6, the operator inserts the guide wire GW into the cannula, protrudes the guide wire GW from the cannula, and inserts the guide wire GW into the bile duct B. Next, the operator withdraws the cannula while leaving the guide wire GW in the bile duct B. Thereby, only the guide wire GW is left in the bile duct B.

Step S7: Stent Selection Step

In step S7, the operator selects the stent 230 to be placed in the stenosis or the like to be treated. The controller 500 assists the stent selection process (step S7) as described below.

Figure 7:
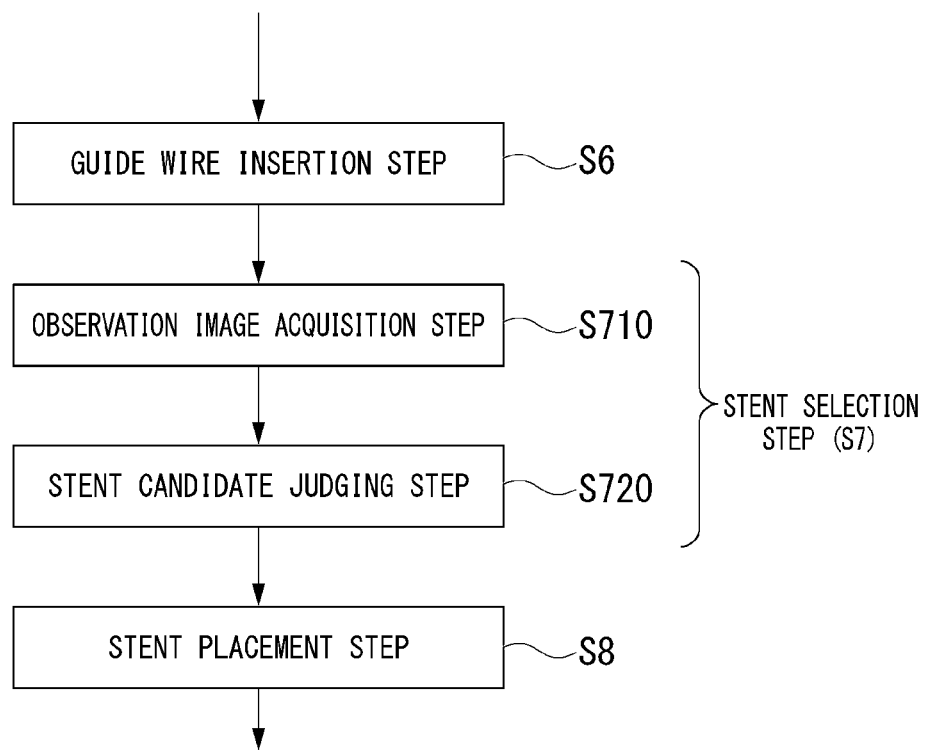
FIG. 7 is a control flowchart of the control device in the stent selection step.

Hereinafter, description will be made regarding the control flowchart of the main controller 460 of the control device 500 in the stent selection step (step S7) shown in FIG. 7. When the operator inputs an operation start instruction to the control device 500, the main controller 460 performs initialization and then starts the following control. First, the main controller 460 (mainly the processor 461) executes step S710.

Step S710: Observation Image Acquisition Step

Figure 8:
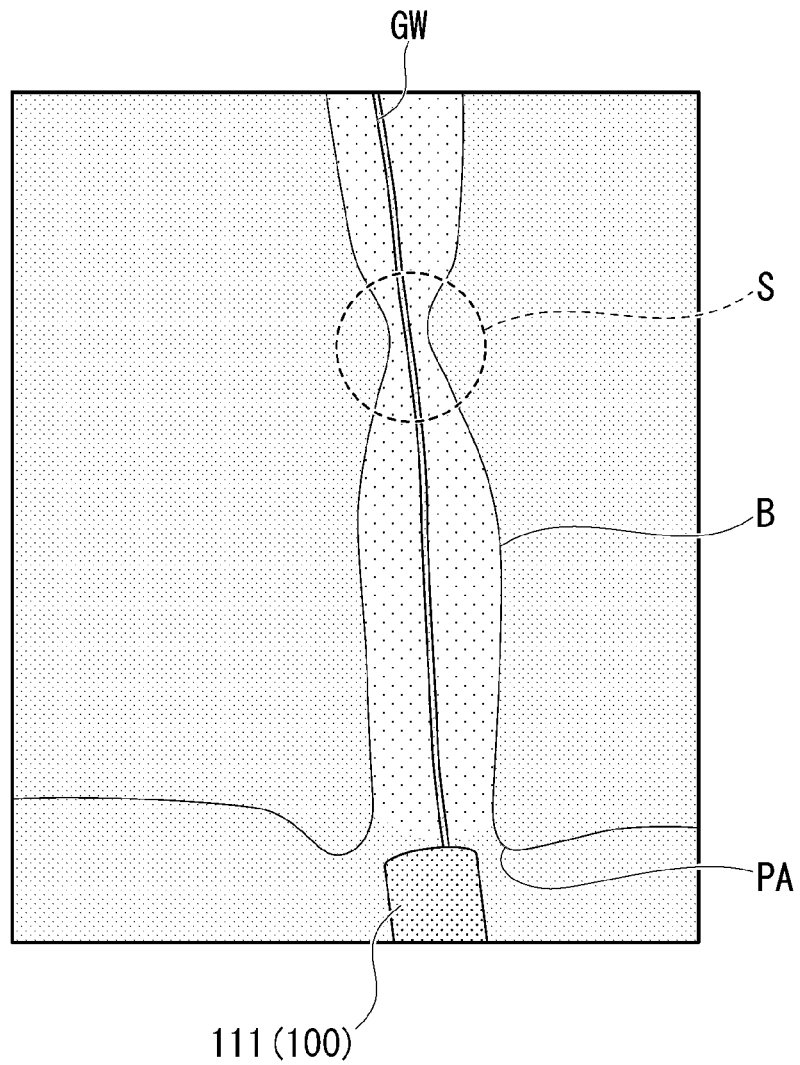
FIG. 8 is an X-ray image acquired by an observation image acquisition step.

FIG. 8 is an X-ray image acquired by the observation image acquisition step.

In step S710, the main controller 460 acquires an X-ray image (observation image) showing the bile duct B and the like. The main controller 460 acquires CT images and MRI images as needed. The main controller 460 then executes step S720.

Step S720: Stent Candidate Judging Step

Figure 9:
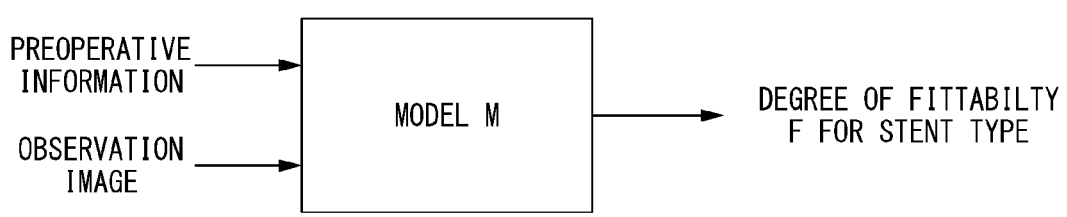
FIG. 9 is a diagram showing a model used in the stent judging step.

FIG. 9 is a diagram showing the model M used in the stent judging step.

In step S720, the main controller 460 judges or determines candidates for the stent 230 to be placed based on the preoperative information and the observation image. Specifically, the main controller 460 judges or determines candidates for the stent 230 to be placed using a model M that inputs preoperative information and an observation image and outputs a degree of fittabilty F for a stent type. It should be noted that the degree of fittabilty F for the stent type does not have to be the degree of fittabilty for all the stent types, and may be the degree of fittabilty for at least the candidate stent types.

It should be noted that preoperative information is not an essential input for model M. When the main controller 460 cannot acquire the preoperative information in the preoperative information acquisition/insertion step (step S1), the input of the preoperative information to the model M may be omitted.

Figure 10:
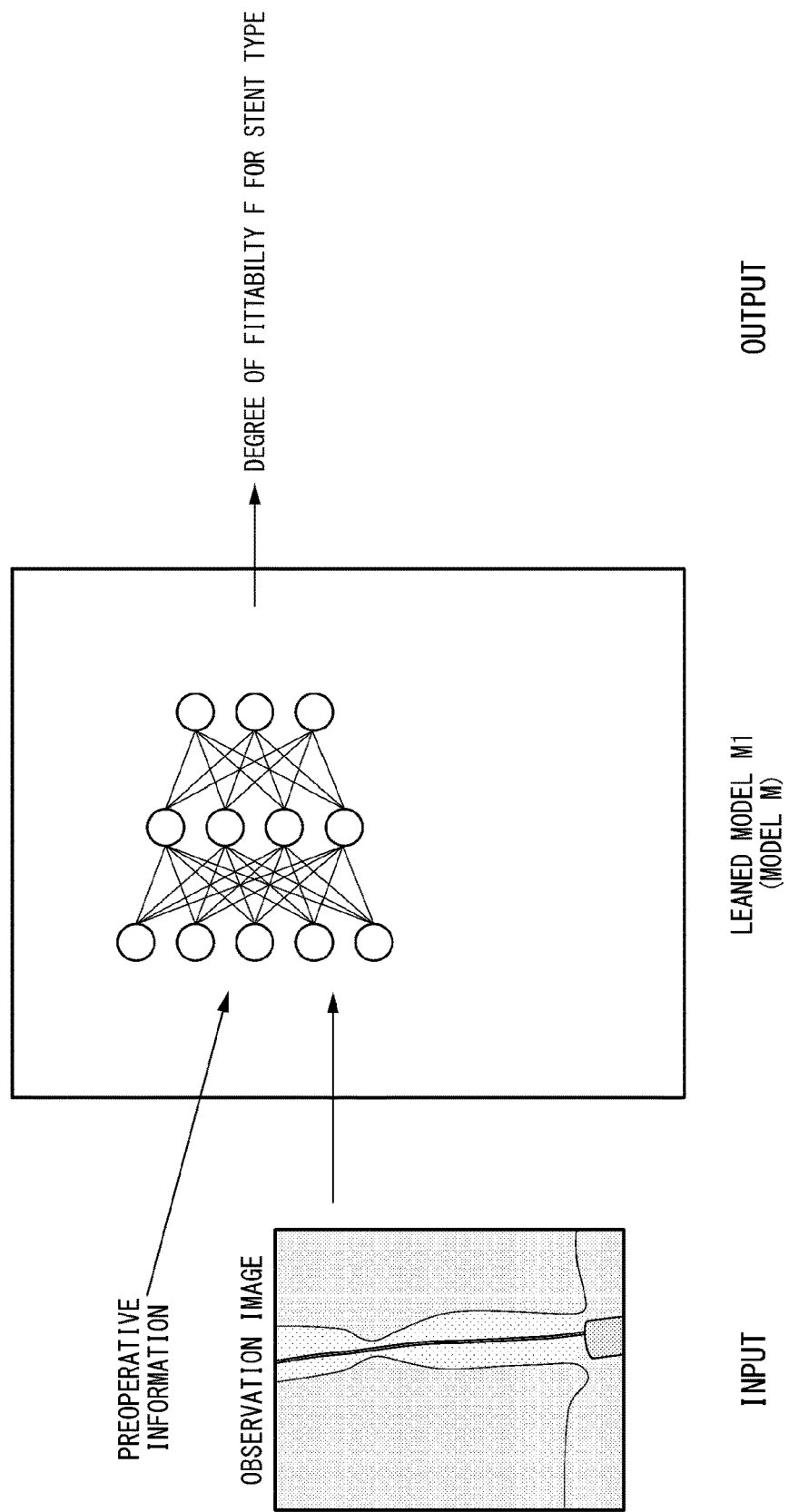
FIG. 10 is a diagram showing a learned model, which is an example of the model.

FIG. 10 is a diagram showing a learned model M1, which is an example of the model M.

The model M is a learned model M1 that has undergone machine learning about the relationship between preoperative information and observation images and the degree of fittabilty F for the stent type. The learned model M1 is, for example, a machine learning model such as a convolutional neural network (CNN), and is a model learned in advance using teacher data. Note that the learned model M1 is not limited to a convolutional neural network, and may be another machine learning model that takes an image as an input. The learned model M1 is recorded in the storage portion 463 of the main controller 460.

When the learned model M1 is a convolutional neural network, the learned model M1 outputs, for example, a normalized accuracy rate for each stent type in the output layer (softmax layer). The learned model M1 outputs the accuracy rate normalized for each stent type as the degree of fittabilty F for the stent type.

The learned model M1 is learned by supervised learning using a well-known technique such as the error backpropagation method. The teacher data used for learning the learned model M1 is past case data (medical case), and is a combination of preoperative information and observation images, and the stent type of the stent 230 actually used. In supervised learning, the parameters of the learned model M1 are updated so that the accuracy rate, which has been normalized for each stent type output by the learned model M1 for preoperative information and observation image, is smaller than the accuracy rate calculated from the teacher data.

It is desirable to prepare training data as diverse as possible by changing the preoperative information (type of organ to be operated on, the status of the affected area to be treated, patient information, etc.). By preparing teacher data of various preoperative information, it is possible to generate a learned model M1 capable of outputting a robust degree of fittabilty F for a stent type in the various preoperative information.

The learned model M1 outputs the stent type and the degree of fittabilty F for the stent type in response to the preoperative information and observation image input. The main controller 460 selects at least one stent type having a high degree of fittabilty F to the stent type, and judges or determines it as a candidate for the stent 230 to be placed. The main controller 460 presents candidates for the stent 230 to be placed to the operator by displaying them on the display device 900, for example. The main controller 460 may control the display device 900 to display the degree of fittabilty F in addition to the stent type so as to serve as a guideline for stent selection by the operator.

Figure 11:
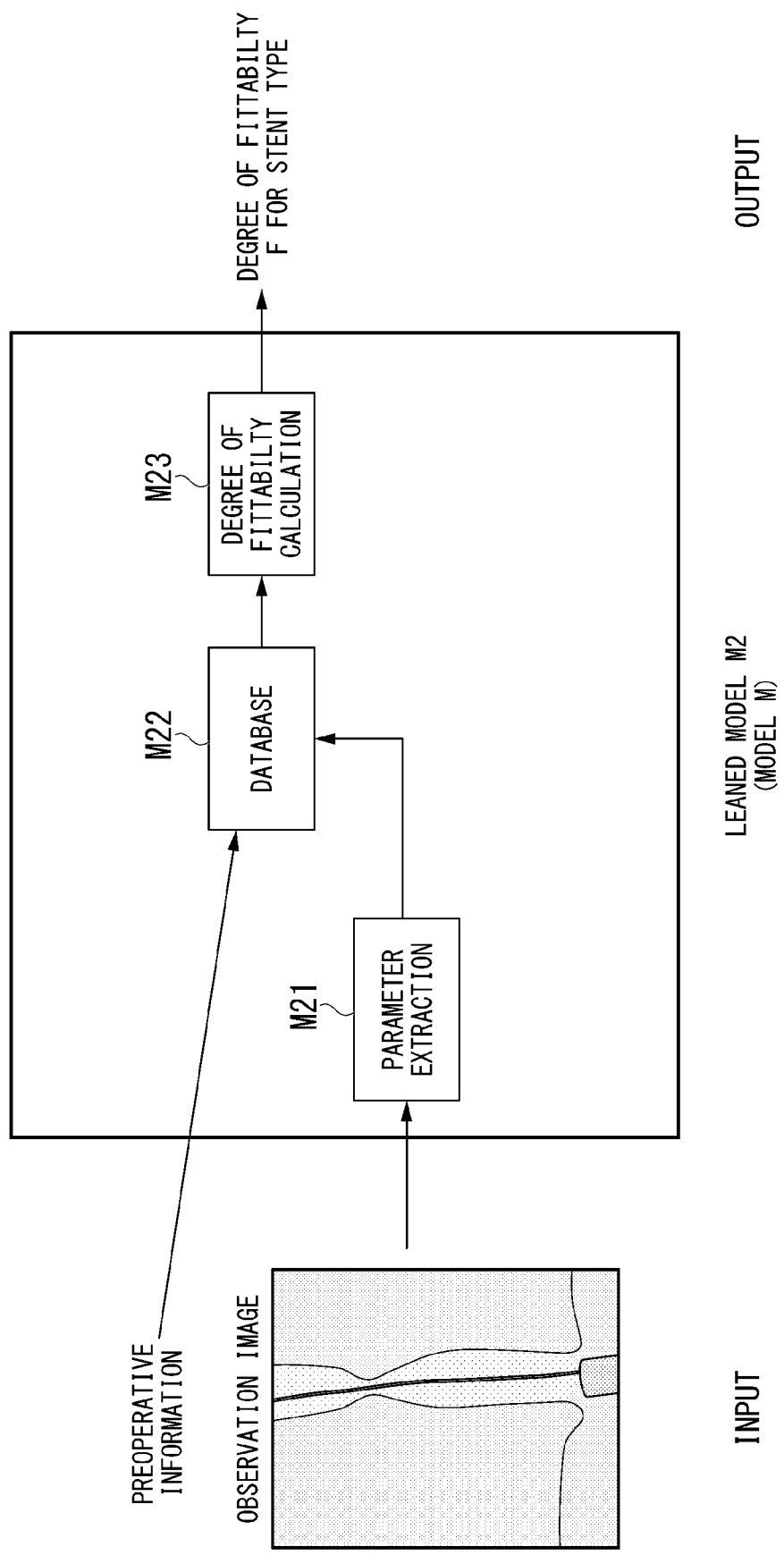
FIG. 11 is a diagram showing a database model as an example of the model.

FIG. 11 is a diagram showing a database model M2, which is an example of the model M.

The model M may be a database model M2 in which preoperative information and observation images are input and the degree of fittabilty F for the stent type is output. The database model M2 is a model that includes, as functional blocks, a parameter extraction M21, a database M22, and a degree of fittabilty calculation M23. The functions of the database model M2 are implemented by the main controller 460 executing software.

In parameter extraction M21, the main controller 460 extracts parameters related to the stenosis S (the position of the stenosis S, the shape of the stenosis S, etc.) from the observation image by known image processing.

FIG. 12 is a diagram showing the database M22 of the database model M2.

The database M22 is, for example, a database in which past cases are registered. In the database M22 shown in FIG. 12, preoperative information, characteristics of stenosis S, and types of stents used are associated with case IDs. The database M22 is recorded in the storage portion 463 of the main controller 460.

In the degree of fittabilty calculation M23, the main controller 460 refers to the database M22 based on the preoperative information and the parameters related to the stenosis S extracted from the observation image, and calculates a degree of similarity with the cases registered in the database M22. Next, the main controller 460 calculates the degree of fittabilty F for the stent type based on the degree of similarity. The main controller 460, for example, calculates the degree of fittabilty F for the stent type such that the higher the degree of similarity with the case registered in the database M22, the higher the degree of fittabilty F. In addition, the main controller 460 also calculates the fittabilty F for the stent type so that, for example, the greater the number of cases registered in the database M22 whose degree of similarity to the extracted parameters related to stenosis S is higher than a predetermined threshold value (hereinafter also referred to as the "number of similar cases"), the higher the degree of fittabilty F.

The main controller 460 may, for example, calculate the degree of fittabilty F based on the "shape of the stenosis S", which is the extracted parameter related to the stenosis S. When the shape of the stenosis is linear, the degree of fittabilty F of the braid-weaved wire stent having a strong axial force is high. On the other hand, when the shape of the stenosis is curved, the degree of fittabilty F of the fence-weaved wire stent, which has a weaker axial force than the braid-weaved wire stent, is high.

For example, the main controller 460 may calculate the degree of fittabilty F based on the "position of the stenosis S", which is the extracted parameter related to the stenosis S. If the stenosis is located on the liver side, it is difficult to replace the stent placed on the liver side, so the degree of fittabilty F of the wire stent, which does not require replacement, increases. On the other hand, when the position of the stenosis is on the papilla side, the replacement of the stent placed on the papilla side is easy to perform, so the degree of fittabilty F of the covered stent, which is a prerequisite for replacement, increases.

The main controller 460 may, for example, calculate the degree of fittabilty F based on the surgical plan input as preoperative information. When a plan to replace the indwelling stent 230 in subsequent surgeries is input as a surgical plan, the degree of fittabilty F of the plastic stent, which is a prerequisite for replacement, increases. On the other hand, if a plan to replace the indwelling stent 230 in subsequent surgeries is not input as a surgical plan, the degree of fittabilty F of the wire stent, which does not assume replacement, increases.

Figure 15:
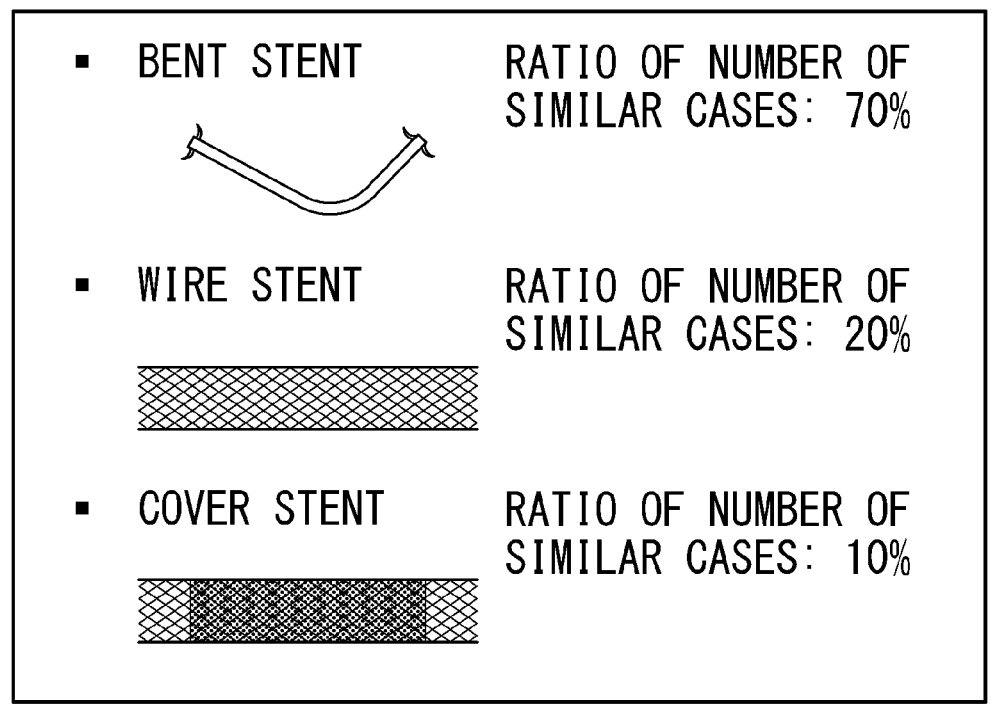
FIG. 15 is a diagram showing proposed stent candidates.

FIGS. 13 to 15 are diagrams showing proposed stent 230 candidates.

The database model M2 outputs the stent type and the degree of fittabilty F for the stent type in response to the input of preoperative information and observation images. The main controller 460 selects at least one stent type having a high degree of fittabilty F to the stent type, and judges or determines it as a candidate for the stent 230 to be placed. The main controller 460 presents candidates for the stent 230 to be placed to the operator by displaying them on the display device 900, for example. As shown in FIG. 13, the main controller 460 may control the display device 900 to display the degree of fittabilty F in addition to the stent type so as to serve as a guideline for stent selection by the operator. The main controller 460 may also control the display device 900 to display the number of similar cases as shown in FIG. 14. As shown in FIG. 15, when presenting a plurality of candidates of the stents 230, the main controller 460 may also control the display device 900 to display the ratio of the number of similar cases for each candidate to the total number of similar cases of the plurality of stents 230 presented as candidates.

The operator selects the stent 230 to be actually used from the stent 230 candidates displayed on the display device 900. After presenting the candidate for the stent 230 to be placed to the operator, the main controller 460 terminates the control of step S720. When the operator requests the stent 230 candidates based on different observation images and preoperative information, the main controller 460 re-executes steps S710 and S720 using new observation images and preoperative information.

Some or all of the control flowchart of the main controller 460 described above may be implemented by the drive controller 360.

Step S8: Stent Placement Step

In step S8, the operator inserts the stent delivery device 200 containing the selected stent 230 into the bile duct B along the guide wire GW. While looking at the displayed image, the operator moves the stent delivery device 200 so that the stent 230 is placed at the optimum position. After that, the operator places the stent 230. The operator withdraws the stent delivery device 200 excluding the stent 230 from the body.

According to the endoscope system (stent delivery system) 1000 of this embodiment, an optimum stent can be selected according to the shape and position of the stenosis. The endoscope system 1000 can calculate the degree of fittabilty F for the stent type based on the model M (learned model M1, database model M2), and can suggest the optimum stent candidate based on the degree of fittabilty F. The endoscope system 1000 can suggest stent candidates suitable for parameters related to the stenosis S (position, shape, etc. of the stenosis S) that can be extracted from the observation image. In addition, the endoscope system 1000 can suggest stent candidates suitable for the input preoperative information.

As described above, the first embodiment of the present disclosure has been described in detail with reference to the drawings, but the specific configuration is not limited to this embodiment, and design changes etc. within the scope of the present disclosure are included. In addition, the constituent elements shown in the above-described first embodiment and modifications shown below can be combined as appropriate.

Second Embodiment

A second embodiment will be described with reference to FIG. 16. In the following description, the same reference numerals are given to the same configurations as those already described, and redundant descriptions will be omitted.

Figure 16:
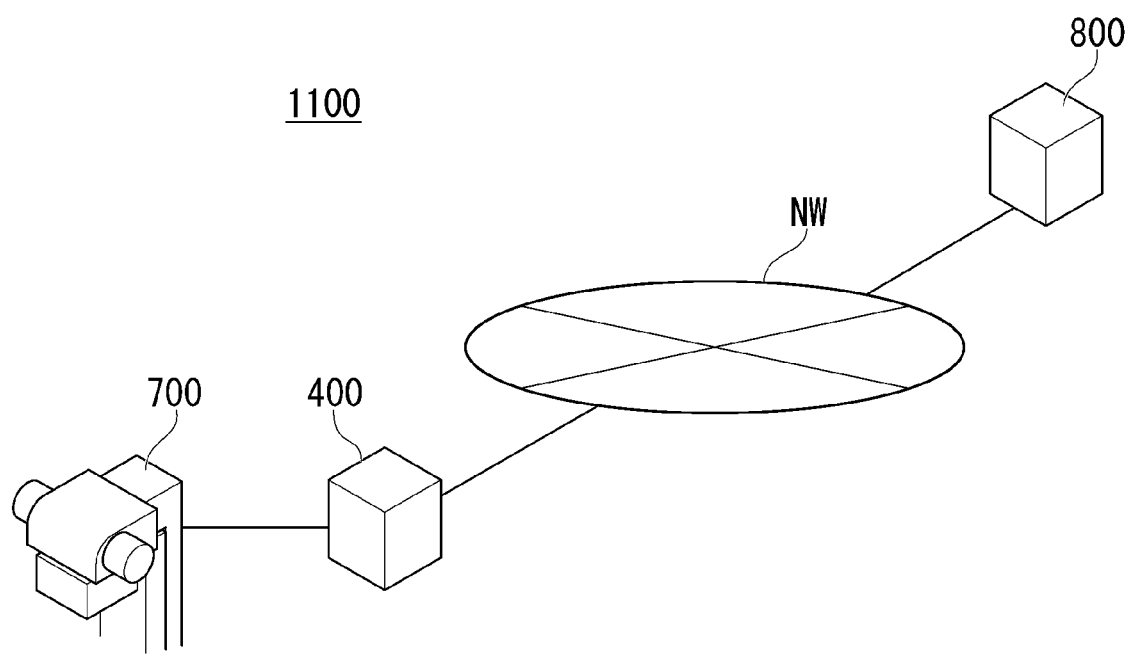
FIG. 16 is a diagram showing the overall configuration of a stent judging system according to a second embodiment.

FIG. 16 is a diagram showing the overall configuration of a stent judging system 1100 according to the second embodiment.

The stent judging system 1100 includes a video control device 400, an observation device 700, and an optimal stent judging device 800 (a control apparatus). The observation device 700 and the optimal stent judging device 800 are connected via a network NW.

The optimal stent judging device 800 acquires an X-ray image (observation image) showing the bile duct B and the like from the video control device 400 via the network NW. Similar to the control device 500 of the first embodiment, the optimal stent judging device 800 judges or determines at least one stent candidate to be placed in the stenosis S based on the observation image. The optimal stent judging device 800 transmits the judged or determined stent candidates to the video control device 400 via the network NW. The video control device 400 presents candidates for the stent 230 to be placed to the operator by displaying them on the display device 900, for example.

According to the stent judging system 1100 of this embodiment, an optimal stent can be selected according to the shape and position of a stenosis. By performing judging processing requiring high-speed computation in the optimal stent judging device 800 connected via the network NW, the size of the device installed in the operating room can be reduced.

Another aspect of the present disclosure relates to stent delivery systems and stent delivery methods.

A stent delivery device is used when a self-expanding stent is placed in a stenosis or occlusion (hereinafter referred to as "stenosis, etc.") that occurs in a lumen. The robot system described in Published Japanese Translation No. 2018-505728 of the PCT International Publication (hereinafter referred to as Patent Document 1) can arrange and leave the stent at a target advance/retract position and/or a target rotational position by controlling a robot having a delivery tool to which the stent is attached.

Problems to be Solved

However, in the robot system described in Patent Document 1, in order to control the robot to advance/retract and/or rotate a delivery tool to which a stent is attached, a user needs to input the target advance/retract position and/or the target rotational position of the stent, and the input operation is complicated.

In view of the above circumstances, an object of the present disclosure is to provide a stent delivery system and a stent delivery method capable of estimating the target advance/retract position and/or the target rotational position of the stent without the user inputting the target advance/retract position and/or the target rotational position of the stent, and retracting and/or rotating the stent to the target advance/retract position and/or the target rotational position.

Apparatus and Methods for Solving the Problem

In order to solve the above problems, this disclosure proposes the following apparatus and methods.

A stent delivery system according to a first aspect of the present disclosure includes: a stent delivery device configured to carry a stent to a stenosis and indwell the stent; an observation device configured to observe the stenosis; a control device configured to acquire an observation image from the observation device; and a driving device configured to drive the stent delivery device under control of the control device, wherein the control device detects a feature position of the stent based on the observation image, and determines a target placement position, which is a position for placing the stent in the stenosis, based on the observation image and the feature position.

A stent delivery method according to a second aspect of the present disclosure is a method for placing a stent with a stent delivery device, the method including: a feature position detection step of detecting a feature position of the stent based on an observation image acquired from an observation device for observing a stenosis; a target placement position determination step of determining a target placement position, which is a position for placing the stent in the stenosis, based on the observation image and the feature position.

According to the stent delivery system and stent delivery method of the present disclosure, even if the user does not input a desired target advance/retract position and/or a target rotational position of the stent, it is possible to estimate a target advance/retract position and/or a target rotational position of the stent, and advance/retract and/or rotate the stent to a target advance/retract position and/or a target rotation position.

First Embodiment

Figure 17:
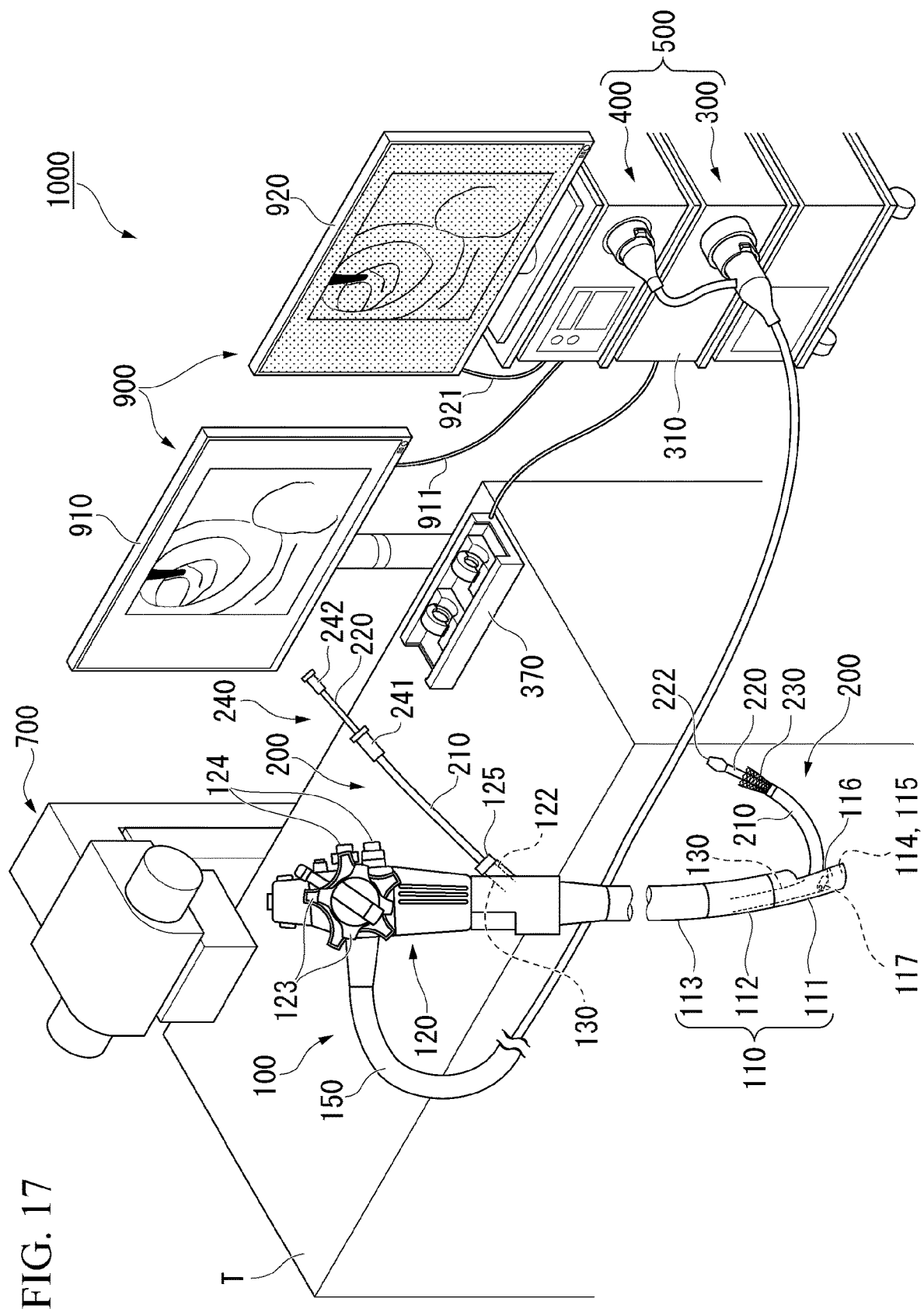
FIG. 17 is a diagram showing the overall configuration of an endoscope system according to a first embodiment.

An endoscope system 1000 according to the first embodiment of the present disclosure will be described with reference to FIGS. 17 to 31. FIG. 17 is a diagram showing the overall configuration of the endoscope system 1000.

Endoscope System 1000

The endoscope system (stent delivery system) 1000 is a medical system for observing and treating the inside of a patient's body. The endoscope system 1000 includes an endoscope 100, a stent delivery device 200, a driving device 300, a video control device 400, an observation device 700, and a display device 900.

The endoscope 100 is a device that is inserted into a patient's lumen to observe and treat an affected area. The endoscope 100 is connected to the driving device 300 and the video control device 400 via a universal cord 150.

The stent delivery device 200 is a device that is inserted into a treatment instrument channel 130 of the endoscope 100 as shown in FIG. 17 to leave a stent 230 in the patient's lumen.

The driving device 300 is connected to the endoscope 100 via the universal cord 150. The driving device 300 drives a built-in pump or the like based on an operation input to an operation portion 120 of the endoscope 100 to cause the endoscope 100 to perform air supply and suction.

The driving device 300 has a delivery device driving device 370 to which an operation portion 240 of the stent delivery device 200 is detachably connected.

The video control device 400 is detachably connected to a video control cable 670. The video control device 400 is connected to the endoscope 100 via the universal cord 150 and acquires captured images from the endoscope 100. The video control device 400 causes the display device 900 to display captured images acquired from the endoscope 100 and GUI images and CG images for the purpose of providing information to the operator.

The driving device 300 and the video control device 400 constitute a control device 500 that controls the endoscope system 1000. The control device 500 may further include peripherals such as a video printer. The driving device 300 and the video control device 400 may be an integrated device.

The observation device 700 is a known X-ray fluoroscopy device that emits X-rays from outside the body to observe a patient. The observation device 700 may include a device for observing a patient by CT (Computed Tomography) or MRI (Magnetic Resonance Imaging). The observation device 700 is connected to the video control device 400 via a connection cable (not shown). Note that the observation device 700 is not limited to the device illustrated in FIG. 17.

The display device 900 includes an endoscope image display device 910 and an observation image device 920. The endoscope image display device 910 is a device capable of displaying images such as an LCD. The endoscope image display device 910 is connected to the video control device 400 via a display cable 911. The observation image device 920 is a device capable of displaying an X-ray image. The observation image device 920 is connected to the video control device 400 via a display cable 921. When the observation device 700 includes a device for observing a patient by CT or MRI, the observation image device 920 includes a device capable of displaying CT images and MRI images.

Next, each device of the endoscope system 1000 will be described in detail.

Endoscope 100

The endoscope 100 is a known side-viewing flexible endoscope, and includes a long insertion portion 110, the operation portion 120 provided at the proximal end of the insertion portion 110, and the universal cord 150 extending from the operation portion 120. Note that the endoscope 100 may be a direct-view flexible endoscope.

The insertion portion 110 includes a distal end rigid portion 111 provided at the distal end, a bendable bending portion 112 provided on the proximal side of the distal end rigid portion 111, and a flexible tube portion 113 provided on the proximal side of the bending portion 112. The insertion portion 110 is formed with the treatment instrument channel 130 through which an endoscopic treatment instrument such as the stent delivery device 200 can be inserted.

A light guide 114, an imaging unit 115 having an imaging device such as a CCD, and a distal end opening 116 communicating with the treatment instrument channel 130 are provided on the side surface of the distal end rigid portion 111.

A raising base 117 is provided near the distal end opening 116 of the distal end rigid portion 111. A proximal end portion of the raising base 117 is rotatably supported by the distal end rigid portion 111. A raising base operation wire (not shown) fixed to the distal end of the raising base 117 extends through the insertion portion 110 to the operation portion 120.

The bending portion 112 can be bent vertically and horizontally. The distal end of the operation wire is fixed to the distal end side of the bending portion 112. The operation wire extends through the insertion portion 110 to the operation portion 120.

The operation portion 120 is provided with a knob 123 for operating the operation wire and the raising base operation wire, and a switch 124 for operating the imaging unit 115 and the like. The operator can bend the bending portion 112 in a desired direction by operating the knob 123.

The operating portion 120 is provided with a forceps opening (proximal end opening) 122 that communicates with the treatment instrument channel 130. The operator can insert an endoscopic instrument such as the stent delivery device 200 through the forceps opening 122. A forceps plug 125 is attached to the forceps opening 122 to prevent leakage of bodily fluids.

The universal cord 150 connects the endoscope 100 to the control device 500. An imaging signal imaged by the imaging unit 115 is transmitted to the video control device 400 via the universal cord 150.

Stent Delivery Device 200

Figure 18:
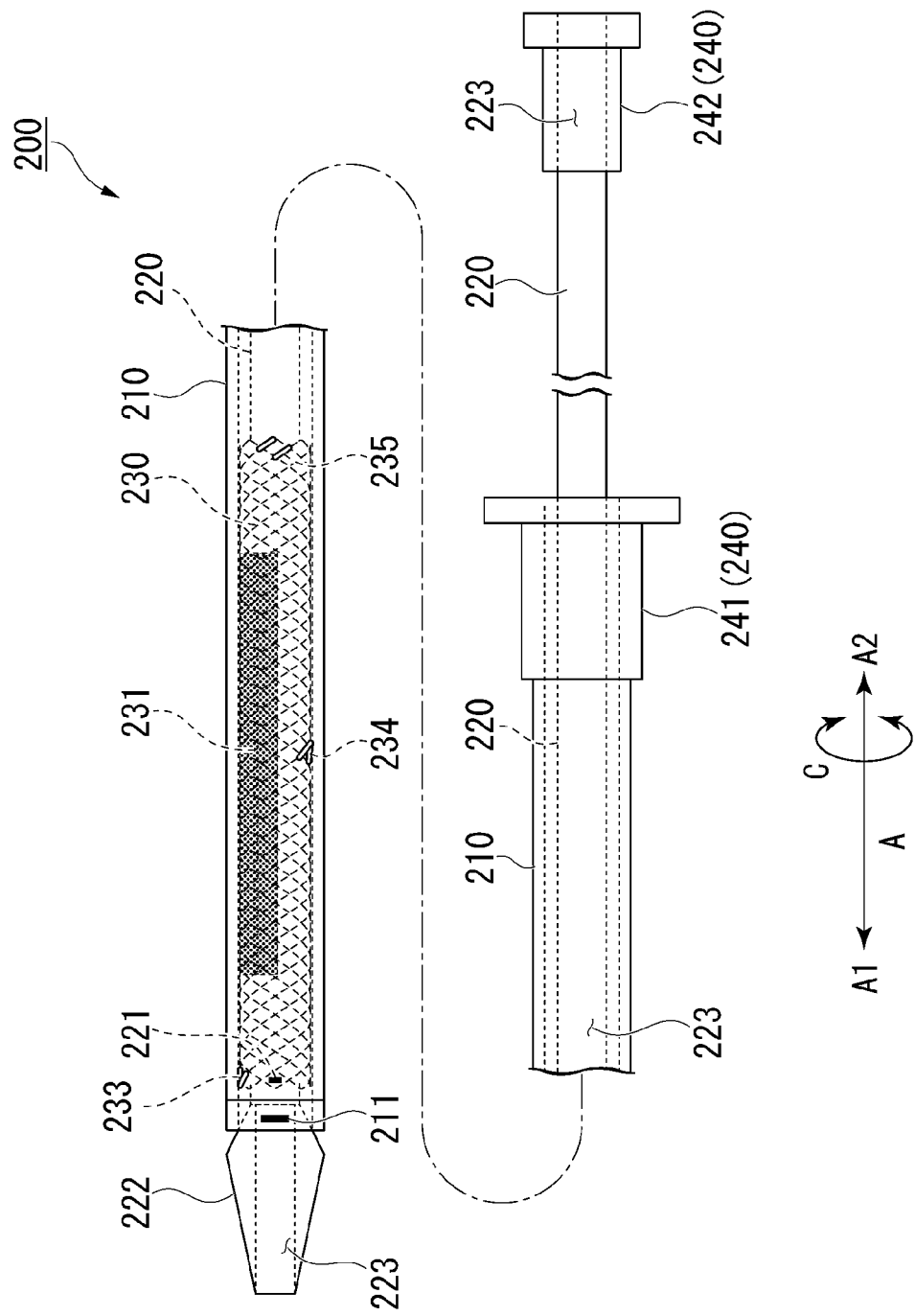
FIG. 18 is a diagram showing a stent delivery device of the endoscope system.

FIG. 18 shows a stent delivery device 200.

The stent delivery device 200 is elongated as a whole and includes an outer tubular member 210, an inner tubular member 220, the stent 230, and the operation portion 240.

In the following description, the side on which the stent delivery device 200 is inserted into the lumen of the patient P in the longitudinal direction A is referred to as a "distal end side (distal side) A1", and the side of the operation portion 240 is referred to as a "proximal end side (proximal side) A2".

The outer cylinder member 210 is formed of resin or the like in a cylindrical shape and has flexibility. The outer cylinder member 210 can be inserted through the treatment instrument channel 130 of the endoscope 100. An outer tube marker 211 that is an X-ray opaque metal marker is provided at the distal end of the outer tube member 210.

The inner cylinder member 220 has an outer diameter smaller than the inner diameter of the outer cylinder member 210 and can be passed through the internal space (lumen) of the outer cylinder member 210. The inner cylinder member 220 is made of resin or the like and has flexibility. A distal tip 222 having an outer diameter larger than that of the outer cylinder member 210 is provided at the distal end of the inner cylinder member 220.

The stent 230 is a tubular self-expanding stent and is formed by weaving wires. The stent 230 is accommodated in the gap between the outer tubular member 210 and the inner tubular member 220 in a state in which the inner tubular member 220 is passed through the inner tubular member 220 and the diameter of the stent 230 is reduced. The stent 230 is locked by a locking portion 221 formed on the outer peripheral surface of the inner tubular member 220. As a result, the stent 230 is positioned relative to the inner cylinder member 220 in a reduced diameter state, and does not move in the longitudinal direction A relative to the inner cylinder member 220.

The wire forming the stent 230 is a superelastic alloy the main material of which is NiTi. A superelastic alloy composed mainly of NiTi is not permanently deformed when it is woven, and the woven shape is memorized by applying a heat treatment in a woven state. The stent 230 may be a laser-cut type stent formed by cutting a metal tube with a laser.

The stent 230 is a partially covered stent with a cover 231. The cover 231 covers the outer surface of the stent 230 with silicone, polyurethane, or the like to prevent blockage due to infiltration of cancer cells or the like. The cover 231 is provided on a part of the stent 230 in the circumferential direction C. That is, it is not provided over the entire circumference in the circumferential direction C.

The stent 230 has less force (axial force) to return to a straight state after being bent, compared to a covered stent provided with a cover over the entire circumference in the circumferential direction C, and can be easily placed in a duct such as a bile duct. On the other hand, the stent 230 needs to be arranged at a position where the cover 231 faces cancer cells or the like when it is indwelled.

The stent 230 has a radiopaque distal end marker 233, a central marker 234, and a proximal end marker 235. The distal end marker 233 is provided on the distal end side A1 of the stent 230. The central marker 234 is provided near the center in the longitudinal direction A of the stent 230. The proximal end marker 235 is provided on the proximal side A2 of the stent 230. The distal end marker 233, the central marker 234, and the proximal end marker 235 are provided at different positions in the circumferential direction C of the stent 230.

The operation portion 240 is provided on the proximal end side A2 of the outer cylinder member 210 and the inner cylinder member 220, and is capable of moving the outer cylinder member 210 relative to the inner cylinder member 220 in the longitudinal direction A. The operation portion 240 has an outer cylinder operation portion 241 that drives the outer cylinder member 210 and an inner cylinder operation portion 242 that drives the inner cylinder member 220.

The operator can place the stent 230 by exposing the accommodated stent 230 by moving the outer tube operation portion 241 to the proximal side A2 with respect to the inner tube operation portion 242. The operator can also re-accommodate (recapture) the stent 230 by moving the outer tube operation portion 241 toward the distal end side A1 with respect to the inner tube operation portion 242.

A guide wire lumen 223 through which the guide wire GW is inserted is formed from the distal tip 222 to the inner cylinder operation portion 242 of the operation portion 240 via the inner cylinder member 220.

Driving Device 300

Figure 19:
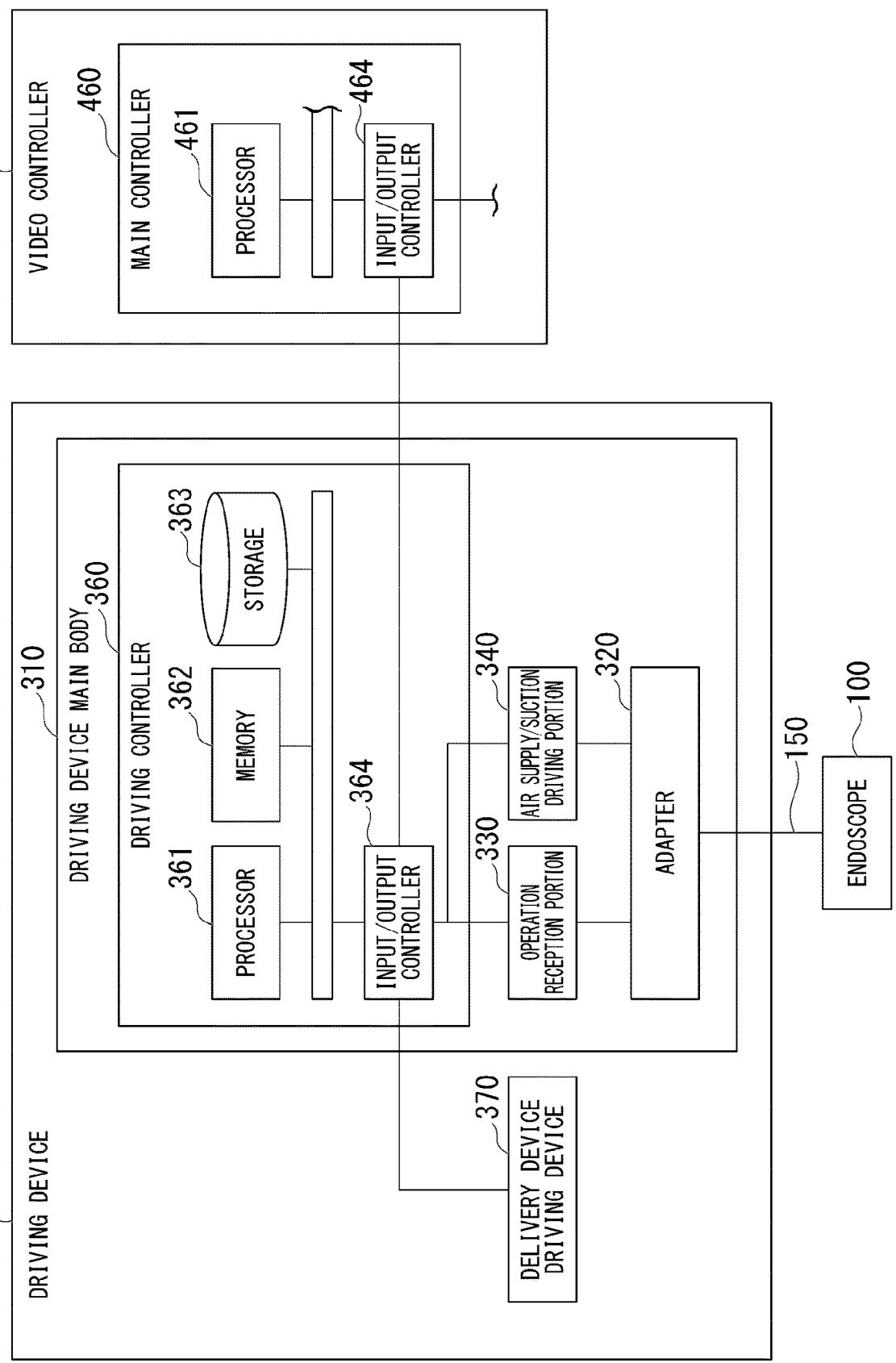
FIG. 19 is a functional block diagram of a driving device of the endoscope system.

FIG. 19 is a functional block diagram of the driving device 300.

The driving device 300 includes a driving device main body 310 and a delivery device driving device 370. The driving device main body 310 and the delivery device driving device 370 may be an integrated device.

The driving device main body 310 has an adapter 320, an operation reception portion 330, an air supply/suction driving portion 340, and a drive controller 360.

The adapter 320 is an adapter to which the universal cord 150 of the endoscope 100 is detachably connected.

The operation reception portion 330 receives operation input from the operation portion 120 of the endoscope 100 via the universal cord 150.

The air supply/suction driving portion 340 is connected to an air supply/suction tube through which the universal cord 150 is inserted. The air supply/suction driving portion 340 includes a pump or the like, and supplies air or liquid to the air supply/suction tube. Also, the air supply/suction driving portion 340 sucks air from the air supply/suction tube.

The drive controller 360 controls the driving device 300 as a whole. The drive controller 360 acquires the operation input received by the operation reception portion 330. The drive controller 360 controls the air supply/suction driving portion 340 and the delivery device driving device 370 based on the acquired operation input and the like.

The drive controller 360 includes a processor 361, a memory 362, a storage portion 363 capable of storing programs and data, and an input/output control portion 364. The drive controller 360 is a programmable computer. The functions of the drive controller 360 are implemented by the processor 361 executing programs. At least some functions of the drive controller 360 may be realized by dedicated logic circuits.

The input/output control portion 364 is connected to the operation reception portion 330, the air supply/suction driving portion 340, the delivery device driving device 370, the video control device 400, the input device (not shown), and the network device (not shown). Under the control of the processor 361, the input/output control portion 364 transmits and receives data and control signals to and from connected devices.

The drive controller 360 may further have components other than the processor 361, the memory 362, the storage portion 363, and the input/output control portion 364. For example, the drive controller 360 may further include an image calculation portion that performs some or all of the image processing and image recognition processing. By further having an image calculation portion, the drive controller 360 can execute specific image processing and image recognition processing at high speed. The image calculation portion may be mounted in a separate hardware device connected via a communication line.

Figure 20:
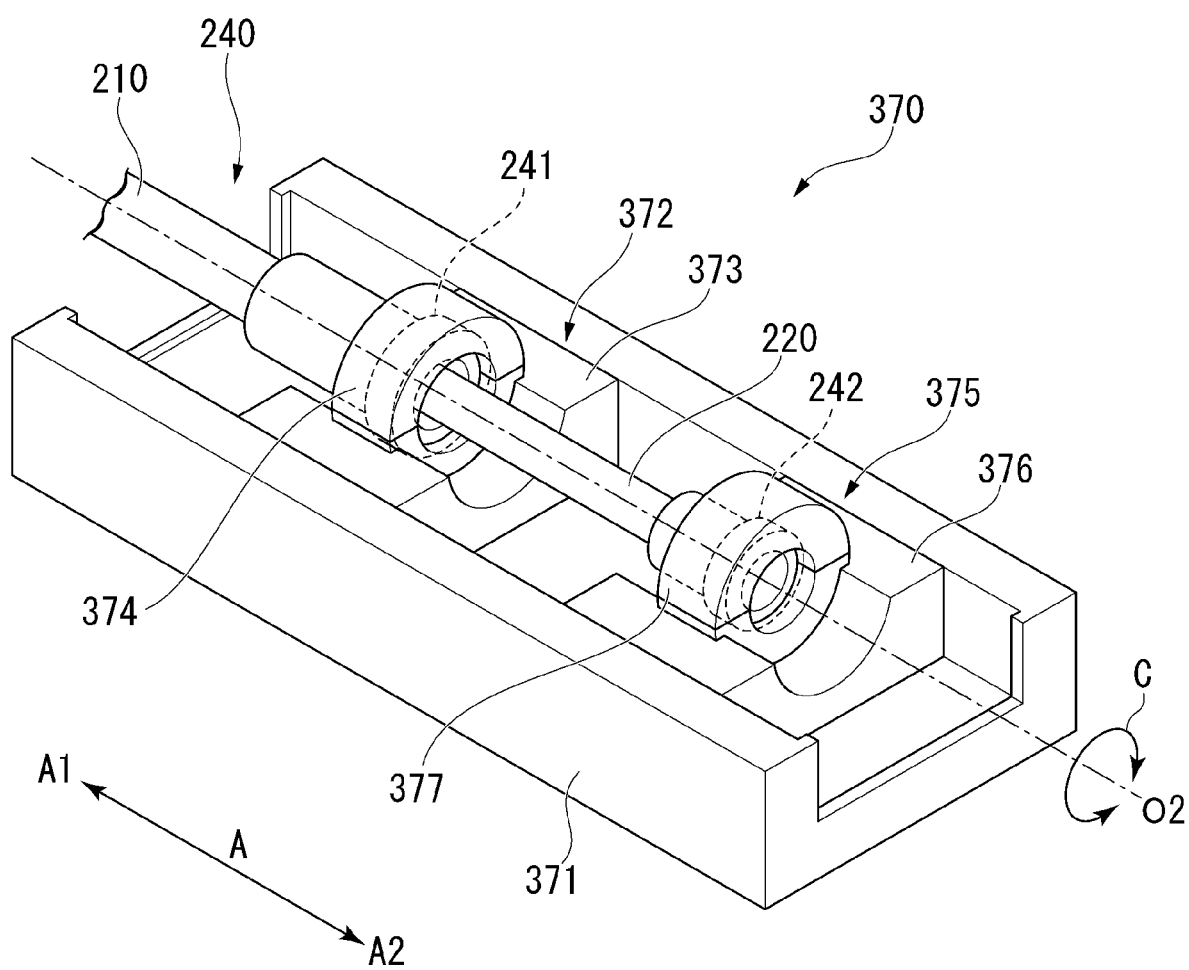
FIG. 20 is a diagram showing a delivery device driving device of the driving device.

FIG. 20 is a diagram showing the delivery device driving device 370.

The delivery device driving device 370 is a device to which the operation portion 240 of the stent delivery device 200 is detachably connected. The delivery device driving device 370 can operate the connected operation portion 240 based on instructions from the drive controller 360.

The delivery device driving device 370 has a main body 371, an outer cylinder driving portion 372, and an inner cylinder driving portion 375.

The outer cylinder driving portion 372 is detachably fixed to the outer cylinder operating portion 241. The outer cylinder driving portion 372 has an outer cylinder advancing/retracting driving portion 373 and an outer cylinder rotation driving portion 374. The outer cylinder advancing/retracting driving portion 373 is driven by a motor or the like, and moves the outer cylinder operating portion 241 forward/backward in the longitudinal direction A with respect to the main body 371. The outer cylinder rotation driving portion 374 is driven by a motor or the like, and rotates the outer cylinder operating portion 241 about the central axis O2 in the longitudinal direction A with respect to the outer cylinder advancing/retracting driving portion 373.

The inner cylinder driving portion 375 is detachably fixed to the inner cylinder operating portion 242. The inner cylinder driving portion 375 has an inner cylinder advancing/retracting driving portion 376 and an inner cylinder rotating driving portion 377. The inner cylinder advancing/retracting driving portion 376 is driven by a motor or the like, and moves the inner cylinder operating portion 242 forward/backward in the longitudinal direction A with respect to the main body 371. The inner cylinder rotation driving portion 377 is driven by a motor or the like, and rotates the inner cylinder operating portion 242 about the central axis O2 in the longitudinal direction A with respect to the inner cylinder advancing/retracting driving portion 376.

Video Control Device 400

Figure 21:
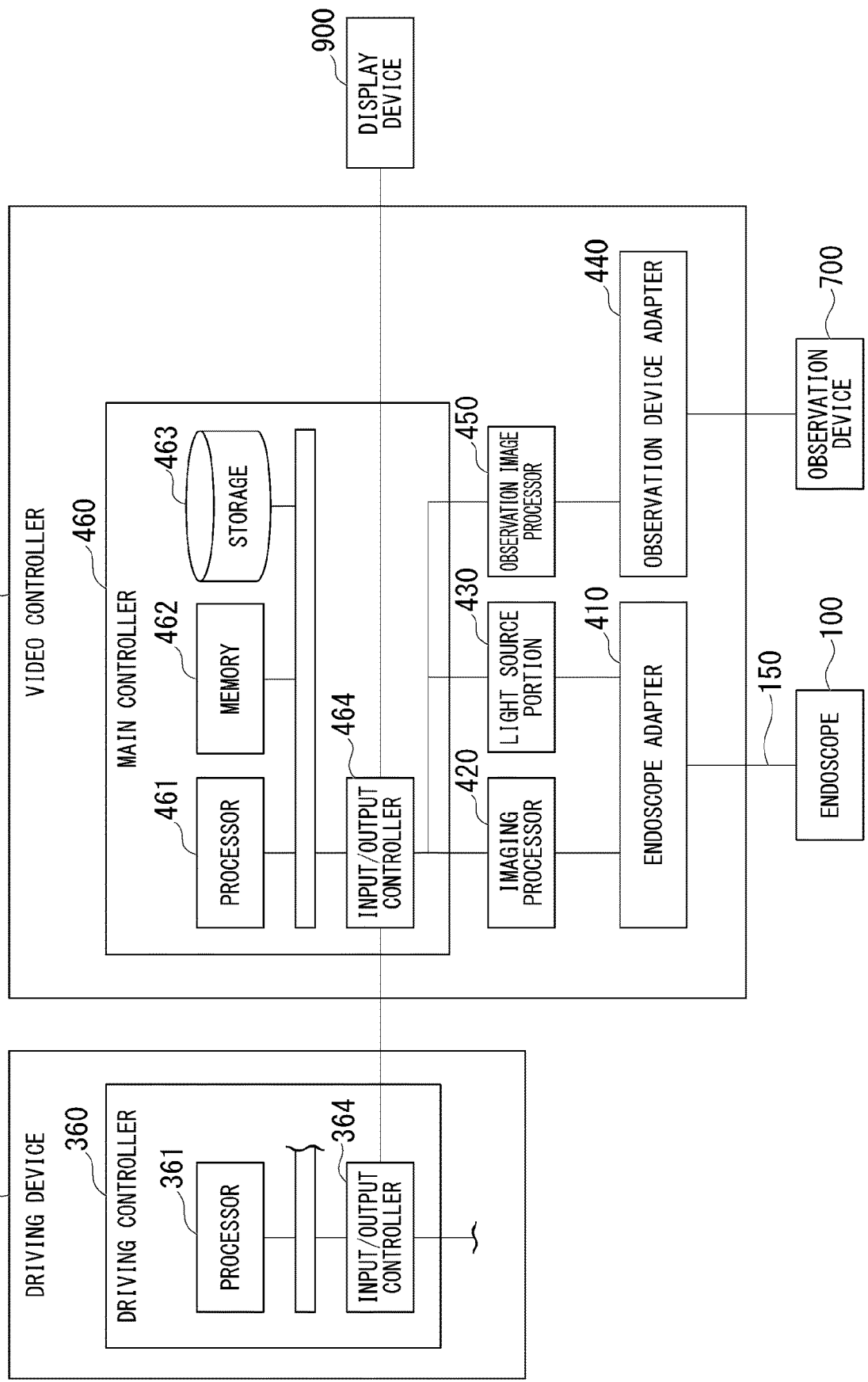
FIG. 21 is a functional block diagram of a video control device of the endoscope system.

FIG. 21 is a functional block diagram of the video control device 400.

The video control device 400 includes an endoscope adapter 410, an imaging processing portion 420, a light source portion 430, an observation device adapter 440, an observation image processing portion 450, and a main controller 460.

The endoscope adapter 410 is an adapter to which the universal cord 150 of the endoscope 100 is detachably connected.

The imaging processing portion 420 acquires imaging signals from the imaging unit 115 of the endoscope 100 via the universal cord 150. The imaging processing portion 420 converts the acquired imaging signal into a captured image.

The light source portion 430 is connected to a light cable through which the universal cord 150 is inserted. The light source portion 430 generates illumination light that irradiates the object to be imaged. The illumination light generated by the light source portion 430 is guided to the light guide 114 of the distal end rigid portion 111 of the endoscope 100 via a light cable or the like.

The observation device adapter 440 is an adapter to which a connection cable (not shown) connected to the observation device 700 is detachably connected.

The observation image processing portion 450 acquires the X-ray observation signal from the observation device 700 via the connection cable. The observation image processing portion 450 converts the acquired X-ray observation signal into an X-ray observation image. When the observation device 700 includes a device for observing a patient by CT, the observation image processing portion 450 converts the obtained CT observation signal into a CT image. When the observation device 700 includes a device for observing a patient by MRI, the observation image processing portion 450 converts the acquired MRI observation signal into an MRI image. Note that the observation device adapter 440 and the observation image processing portion 450 may be devices separated from the video control device 400.

The main controller 460 has a processor 461, a program-readable memory 462, a storage portion 463, and an input/output control portion 464. The main controller 460 is a computer capable of executing programs. The functions of the main controller 460 are implemented by the processor 461 executing programs. At least some of the functions of the main controller 460 may be realized by a dedicated logic circuit.

The storage portion 463 is a non-volatile recording medium that stores the above-described programs and necessary data. The storage portion 463 is composed of, for example, a ROM, a hard disk, or the like. A program recorded in the storage portion 463 is read into the memory 462 and executed by the processor 461.

The input/output control portion 464 is connected to the imaging processing portion 420, the light source portion 430, the observation image processing portion 450, the driving device 300, the display device 900, an input device (not shown), and network equipment (not shown). Under the control of the processor 461, the input/output control portion 464 transmits and receives data and control signals to and from connected devices.

The main controller 460 can perform image processing on the captured image acquired by the imaging processing portion 420 and the X-ray observation image acquired by the observation image processing portion 450. The main controller 460 can generate GUI images and CG images for the purpose of providing information to the operator S. The main controller 460 can control the display device 900 to display captured images, X-ray observation images, GUI images, and CG images on the display device 900.

The main controller 460 is not limited to an integrated hardware device. For example, the main controller 460 may be configured by separating a part of it as a separate hardware device and then connecting the separated hardware device with a communication line. For example, the main controller 460 may be a cloud system that connects the separated storage portions 463 with a communication line.

The main controller 460 may further have components other than the processor 461, the memory 462, the storage portion 463, and the input/output control portion 464. For example, the main controller 460 may further have an image calculation portion that performs some or all of the image processing and image recognition processing. By further having an image calculation portion, the main controller 460 can execute specific image processing and image recognition processing at high speed. The image calculation portion may be mounted in a separate hardware device connected via a communication line.

Operation of Endoscope System 1000

Figure 22:
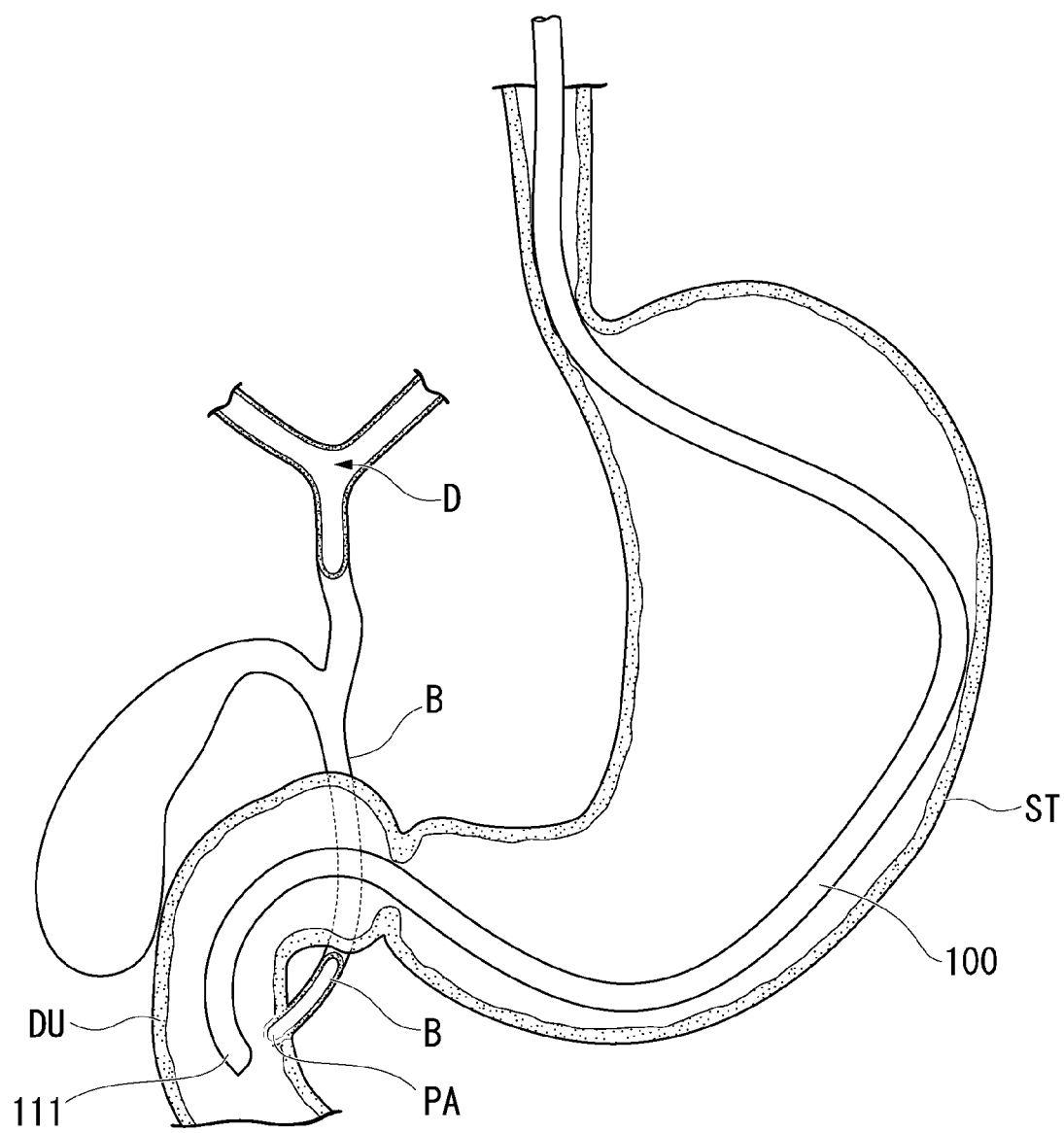
FIG. 22 is a diagram showing a bile duct in which a stent is placed.
Figure 23:
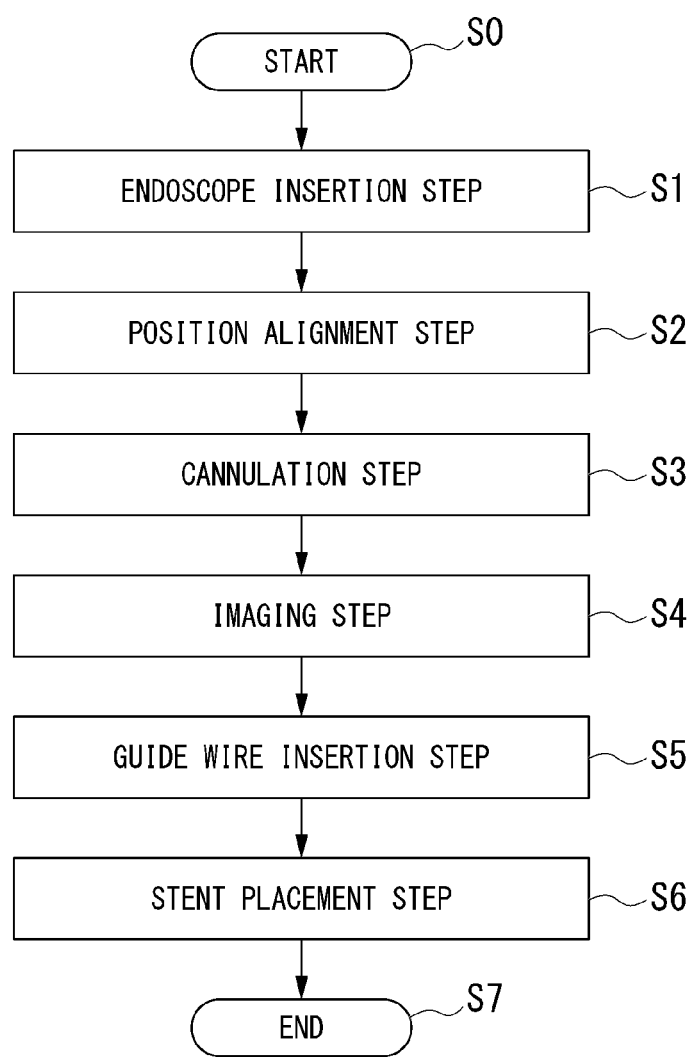
FIG. 23 is a follow-up chart showing the procedure for placing the stent.

Next, the operation of the endoscope system 1000 according to this embodiment will be described. Specifically, a procedure for placing the stent 230 in the bile duct B by endoscopic retrograde cholangiopancreatography (ERCP) will be described. FIG. 22 shows a bile duct B in which the stent 230 is placed. FIG. 23 is a flow chart showing the steps of the procedure.

Step S1: Endoscope Insertion Step

In step S1, the operator inserts the insertion portion 110 of the endoscope 100 into the patient's lumen through a natural opening such as the mouth. The operator bends the bending portion 112 by operating the knob 123 or the like as necessary. The operator inserts the distal end rigid portion 111 of the endoscope 100 into the duodenum DU.

Step S2: Position Alignment Step

In step S2, the operator adjusts the position of the distal end rigid portion 111 of the endoscope 100 so that the papilla PA is within the imaging range of the imaging unit 115 of the endoscope 100.

Step S3: Cannulation Step

The operator inserts a cannula from the papilla PA into the bile duct B in step S3. Specifically, a cannula is inserted into the treatment instrument channel 130 of the endoscope 100 to protrude from the distal end opening 116, and the cannula is inserted into the bile duct B.

Step S4: Imaging Step

In step S4, the operator injects the contrast medium into the cannula to flow the contrast medium into the bile duct B through the cannula. The operator obtains an X-ray image showing the bile duct B and the like by performing X-ray imaging using the observation device 700. The operator acquires CT images and MRI images as necessary.

Step S5: Guide Wire Insertion Step

The operator inserts the guide wire GW into the cannula, protrudes the guide wire GW from the cannula, and inserts the guide wire GW into the bile duct B in step S5. Next, the operator withdraws the cannula while leaving the guide wire GW in the bile duct B. Thereby, only the guide wire GW is left in the bile duct B.

Step S6: Stent Placement Step

The operator inserts the stent delivery device 200 into the bile duct B along the guide wire GW in step S6. The control device 500 assists the stent placement step (step S6) as described below.

Figure 24:
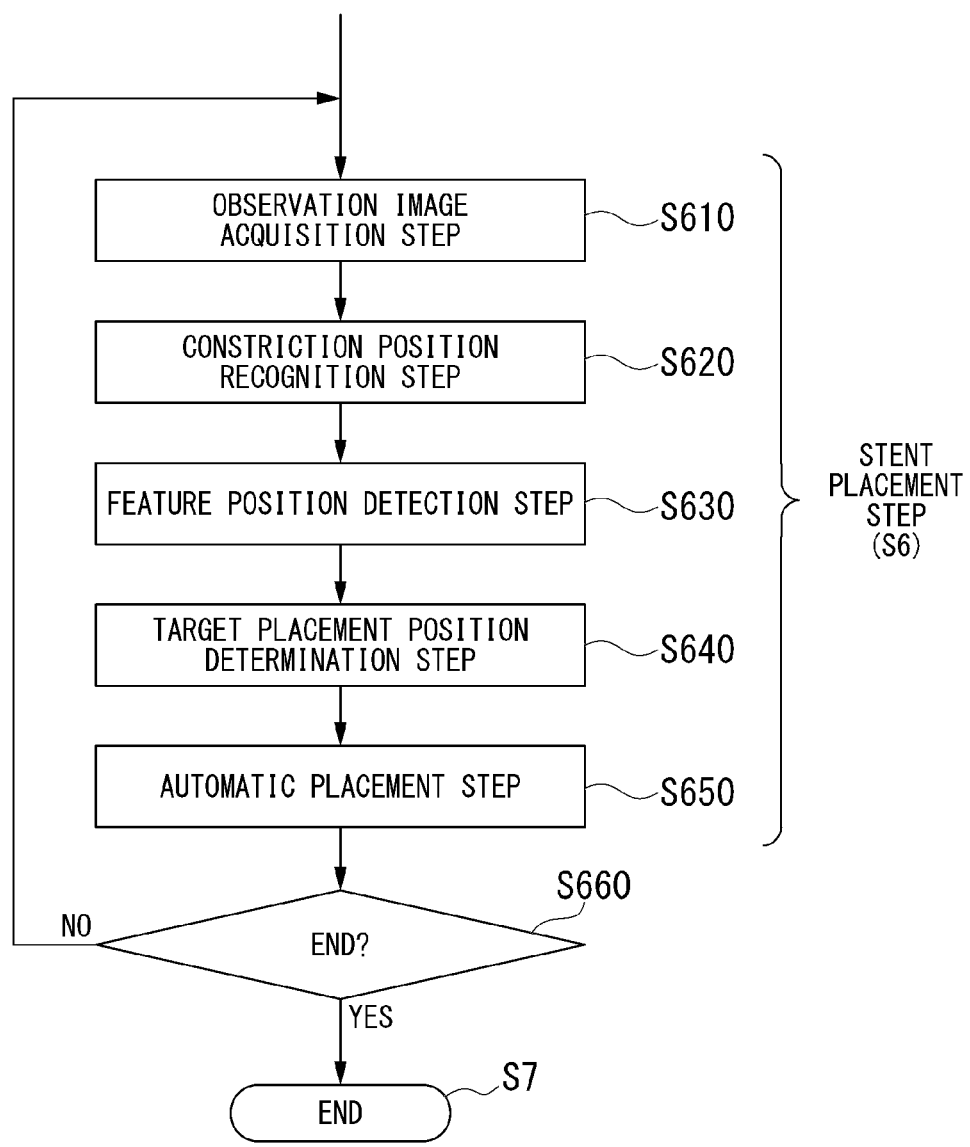
FIG. 24 is a control flowchart of the control device of the endoscope system in the stent placement step.

Hereinafter, description will be given along the control flowchart of the main controller 460 of the control device 500 in the stent placement step (step S6) shown in FIG. 24. When the operator inputs an operation start instruction to the control device 500, the main controller 460 performs initialization and then starts the following control. First, the main controller 460 (mainly processor 461) executes step S610.

Step S610: Observation Image Acquisition Step

Figure 25:
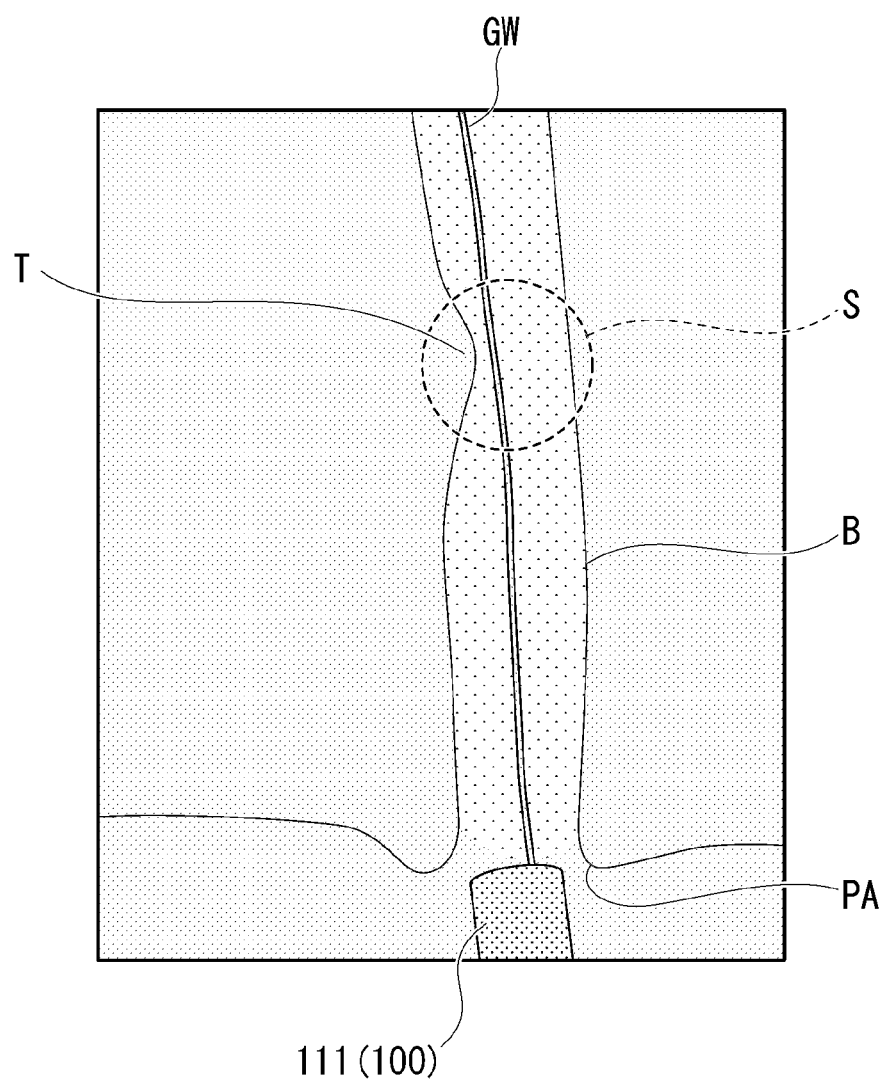
FIG. 25 is an X-ray image acquired by an observation image acquisition step.

FIG. 25 is an X-ray image acquired by the observation image acquisition step.

In step S610, the main controller 460 acquires an X-ray image (observation image) showing the bile duct B and the like. The main controller 460 acquires CT images and MRI images as needed. The main controller 460 then executes step S620.

Step S620: Constriction Position Recognition Step

The main controller 460 recognizes the position of the stenosis S based on the observed image in step S620. Specifically, the main controller 460 recognizes a portion of the bile duct B in the observation image that has a smaller inner diameter than other portions as the stenosis S. The stenosis S shown in FIG. 25 is formed by cancer cells (lesion, affected area) T generated in a part of the bile duct B in the circumferential direction. The main controller 460 then executes step S630.

Figure 26:
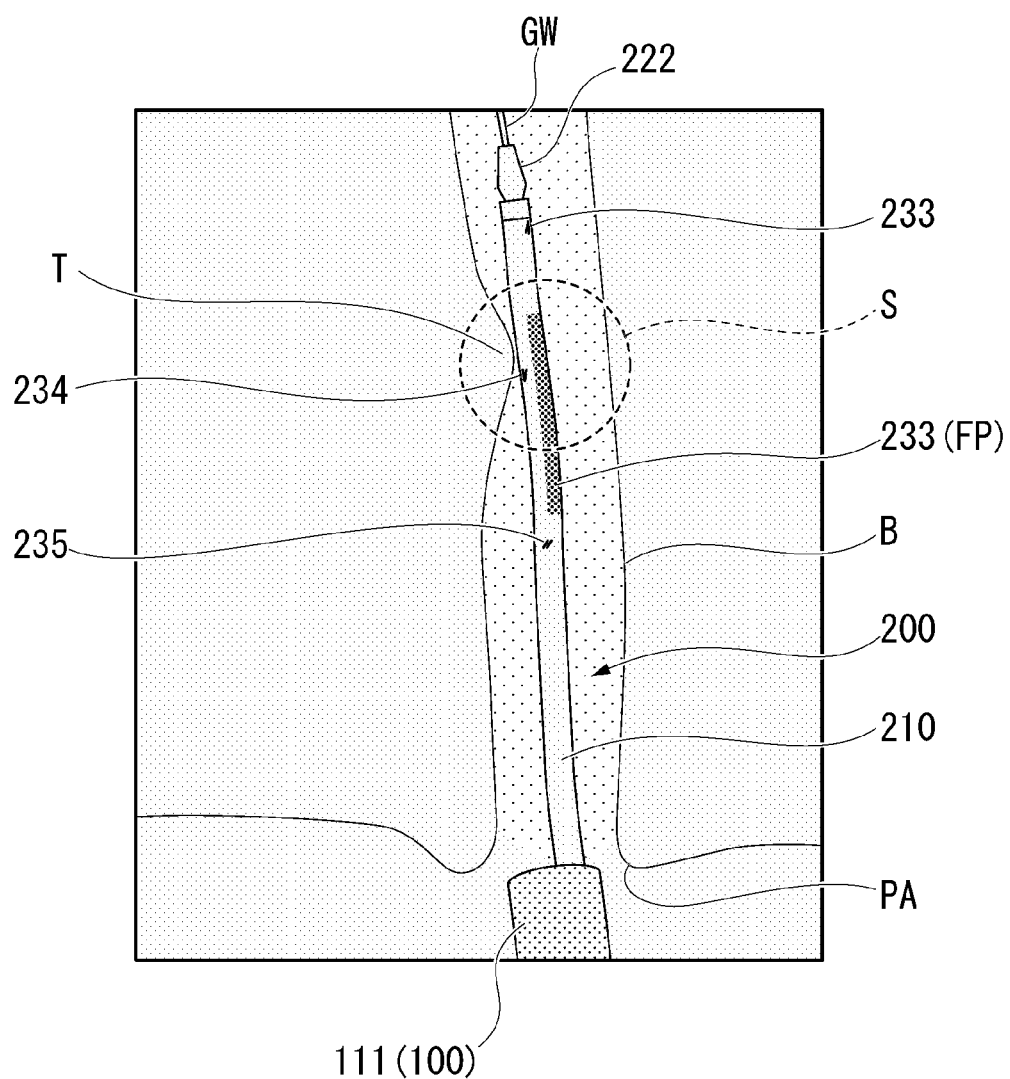
FIG. 26 shows the stent delivery device moved to the vicinity of the stenosis.

FIG. 26 is a diagram showing the stent delivery device 200 moved to the vicinity of the stenosis S.

The operator operates the stent delivery device 200 under X-ray fluoroscopy to move the stent delivery device 200 along the guide wire GW to the liver side, and moves the portion containing the stent 230 in the stent delivery device 200 to the vicinity of the stenosis S.

Step S630: Feature Position Detection Step

The main controller 460 detects a feature position FP of the stent 230 based on the observed image in step S630. The feature position FP of the stent 230 is the "partial position of the stent 230" the placement of which should be considered when placing the stent 230, and is the "position of the cover 231" in this embodiment. The main controller 460 can recognize the positions of the distal end marker 233, the central marker 234, and the proximal end marker 235 from the observed image, and detect the position of the cover 231 (feature position FP) from the relative positions of these markers. The main controller 460 may detect the position (feature position FP) of the cover 231 by a sensor or the like provided in the stent delivery device 200. The sensor is, for example, an optical shape sensor attached to the stent delivery device 200, and can detect the posture of the stent delivery device 200 using scattered signals from the optical fibers, and detect the position in the longitudinal direction A and the position in the circumferential direction C of the cover 231 as the position of the cover 231 (feature position FP). The main controller 460 then executes step S640.

Step S640: Target Placement Position Determination Step

In step S640, the main controller 460 determines the "target placement position TP" for placing the stent 230 in the stenosis S based on the observed image and the feature position FP. The "target placement position TP" includes a "target advance/retract position TP1" that is a position in the longitudinal direction (advance/retract direction) A at which the stent 230 is placed, and a "target rotational position TP2" that is a position in the circumferential direction (rotational direction) C where the stent 230 is placed.

The main controller 460 determines the target placement position TP of the stent 230 at which the feature position FP is placed at the optimum position. In the present embodiment, the target placement position TP is the position of the stent 230 at which the cover 231 (feature position FP) faces the cancer cells T (optimal position). Specifically, the target advance/retract position TP1 is the position of the stent 230 where the central marker 234 positioned near the center of the cover 231 of the stent 230 in the longitudinal direction A is arranged at substantially the same position as the cancer cells T in the longitudinal direction A. The target rotational position TP2 is the position of the stent 230 where the cover 231 of the stent 230 is arranged at substantially the same position as the cancer cells T in the circumferential direction C.

After determining the target placement position TP of the stent 230, the main controller 460 executes step S650.

Step S650: Automatic Placement Step

In step S650, the main controller 460 drives the delivery device driving device 370 and operates the operation portion 240 of the stent delivery device 200 to automatically place the stent 230 at the target placement position TP.

Figure 27:
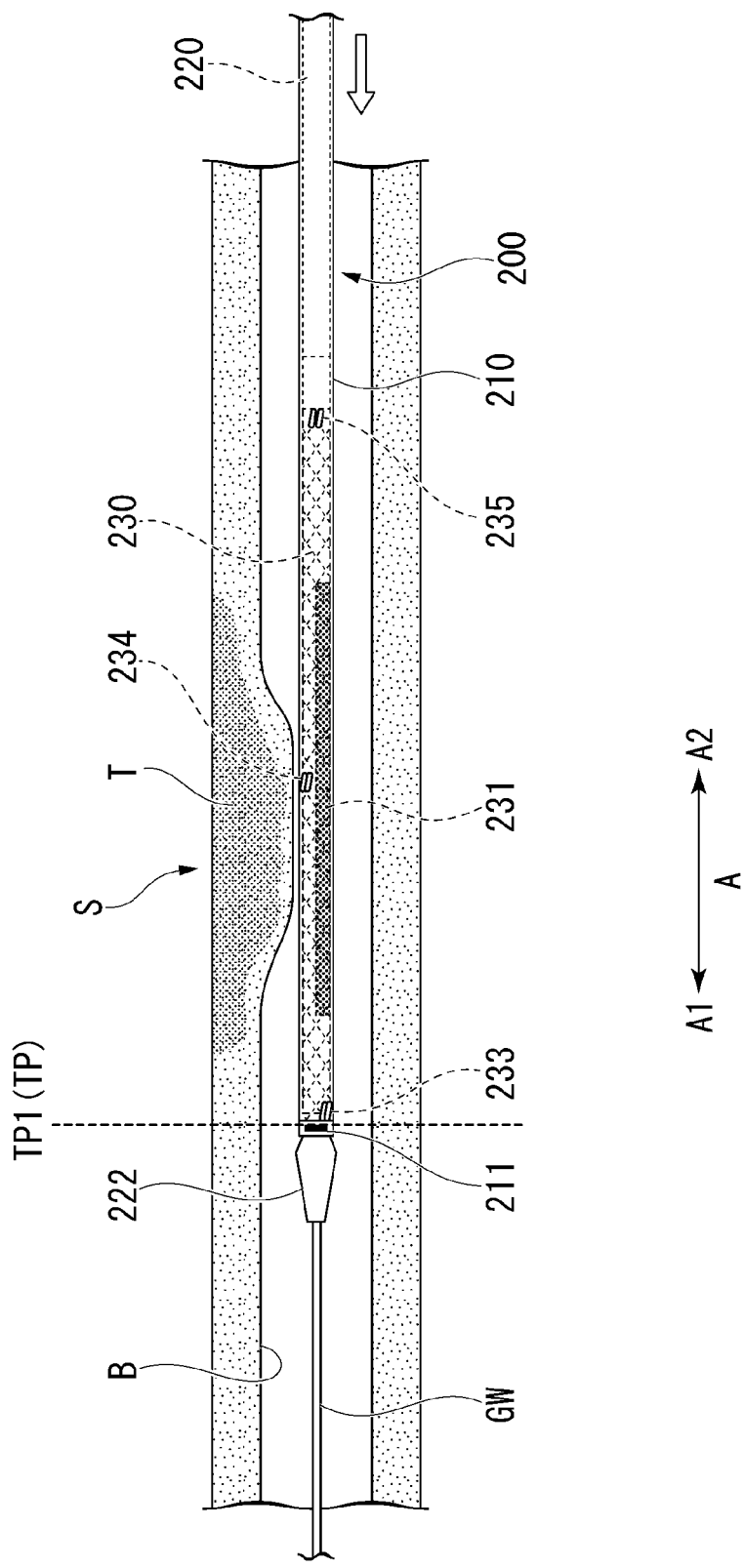
FIG. 27 is a diagram for explaining an automatic placement step.

FIG. 27 is a diagram explaining the automatic placement step.

The main controller 460 drives the delivery device driving device 370 by communicating with the drive controller 360 to operate the operation portion 240 of the stent delivery device 200. Specifically, the main controller 460 advances and retracts the stent delivery device 200 in the longitudinal direction A until the stent 230 substantially coincides with the target advance/retract position TP1. The main controller 460 advances and retracts the entire stent delivery device 200 by driving the delivery device driving device 370 to simultaneously advance and retract the outer cylinder driving portion 372 and the inner cylinder driving portion 375.

Figure 28:
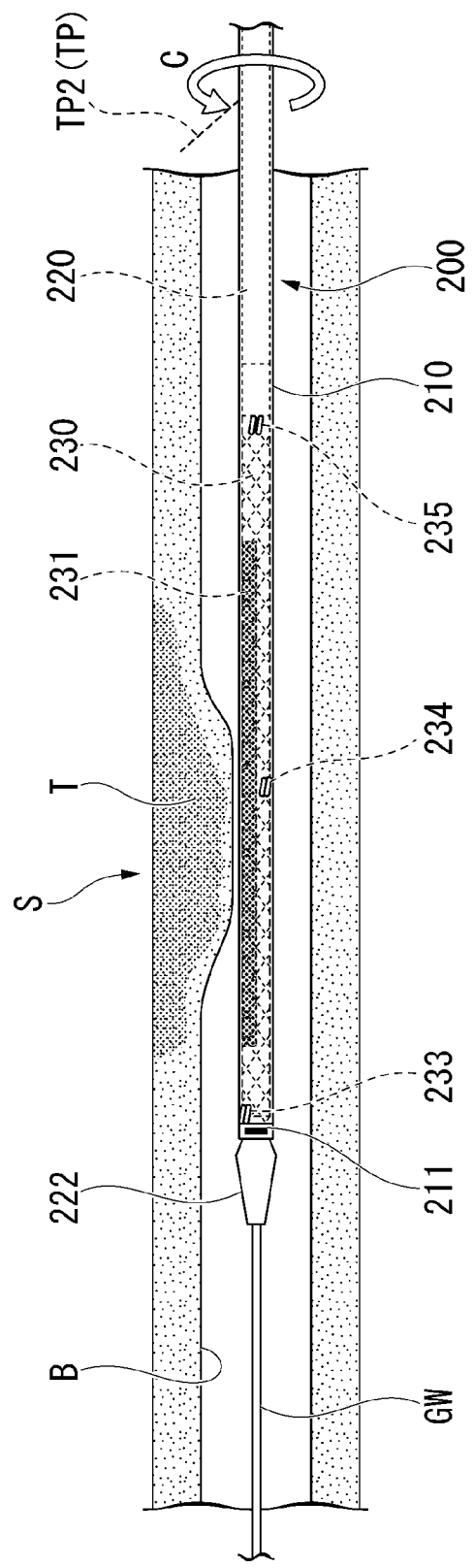
FIG. 28 is a diagram showing the stent being placed in the automatic placement step.

FIG. 28 is a diagram showing the stent 230 rotated during the automatic placement step.

Next, the main controller 460 drives the inner cylinder driving portion 375 of the delivery device driving device 370 until the stent 230 substantially coincides with the target rotational position TP2, thereby rotating the inner cylinder operating portion 242 and the inner cylinder member 220 in the circumferential direction C. Note that the main controller 460 may simultaneously drive the outer cylinder driving portion 372 and the inner cylinder driving portion 375 to rotate the outer cylinder member 210 and the inner cylinder member 220 at the same time.

Figure 29:
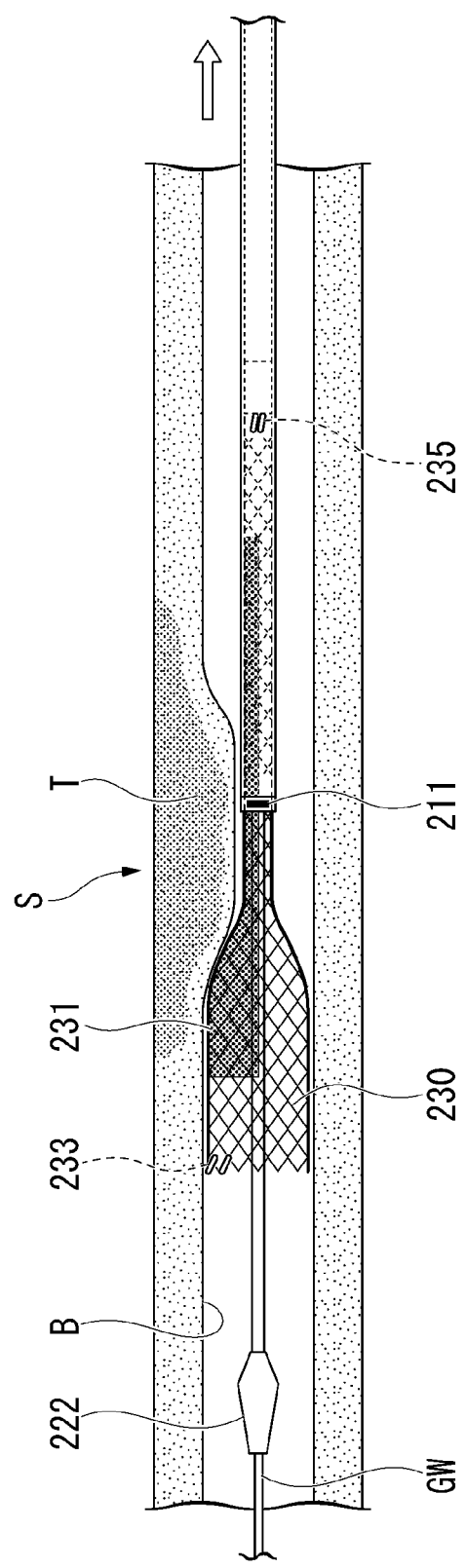
FIG. 29 is a diagram showing the stent being deployed in the automatic placement step.

FIG. 29 is a diagram showing the stent 230 being deployed in the automatic placement step.

After the stent 230 is placed at the target placement position TP (the target advance/retract position TP1 and the target rotational position TP2), the main controller 460 drives the delivery device driving device 370 to release the stent 230 for placement. The delivery device driving device 370 exposes the accommodated stent 230 by moving the outer tube operation portion 241 to the proximal end side A2 with respect to the inner tube operation portion 242, and places the stent 230 therein. As a result, the stent 230 is left in a state where the cover 231 (feature position FP) is arranged at a position facing the cancer cells T (optimal position).

Figure 30:
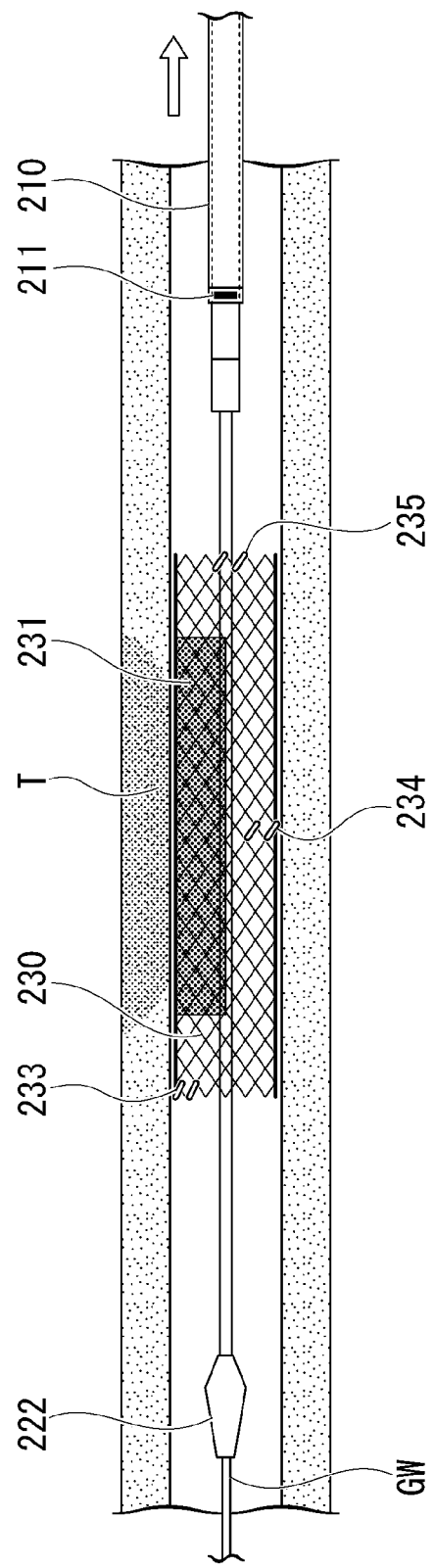
FIG. 30 is a diagram showing the stent placed in the automatic placement step.

FIG. 30 shows the stent 230 placed in the automatic placement step.

The main controller 460 executes step S660 when the automatic placement of the stent 230 is completed or when an input to suspend the automatic placement of the stent 230 is received from the operator.

Step S660: End Determination Step

In step S660, the main controller 460 determines whether the operator or the like has input to end the stent placement step (step S6). If the stent placement step (step S6) is not finished, the main controller 460 performs step S610 (observation data acquisition step) again. For example, if the posture of the patient or the position of the observation device 700 changes, the main controller 460 restarts the process from step S610 to re-determine the "target placement position TP".

When ending the stent placement step (step S6), the main controller 460 ends the control of the stent placement step (step S6). The operator withdraws the stent delivery device 200 excluding the stent 230 from the body.

Some or all of the control flowchart of the main controller 460 described above may be implemented by the drive controller 360.

According to the endoscope system (stent delivery system) 1000 of this embodiment, it is easy to place the stent at the target position. The endoscope system (stent delivery system) 1000 can estimate the target placement position TP of the stent 230 without the user inputting the target placement position TP of the stent 230 (the target advance/retract position TP1 and the target rotational position TP2), and can advance/retract the stent 230 to the target placement position TP or rotate the stent 230.

As described above, the first embodiment of the present disclosure has been described in detail with reference to the drawings, but the specific configuration is not limited to this embodiment, and design changes etc. within the scope of the present disclosure are included. In addition, the constituent elements shown in the above-described first embodiment and modifications shown below can be combined as appropriate.

Figure 31:
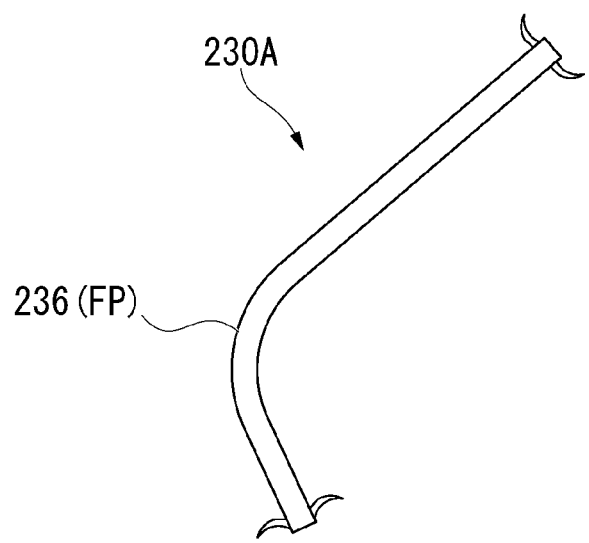
FIG. 31 is a diagram explaining another aspect of the feature position of the stent.

For example, in the above embodiment, the feature position FP of the stent 230 was the cover 231 provided on a part of the stent 230 in the circumferential direction C, but the aspect of the feature position FP is not limited to this. FIG. 31 shows a bend stent 230A. The feature position FP may be a curved bend 236 in the bend stent 230A. The main controller 460 determines the target placement position TP of the bend stent 230A at which the bending portion 236 (feature position FP) is positioned along the curved shape of the lumen (optimal position). Specifically, the target advance/retract position TP1 is the position of the bend stent 230A where the bending portion 236 of the bend stent 230A is arranged at substantially the same position in the longitudinal direction A as the curved shape of the lumen. The target rotational position TP2 is a position of the bend stent 230A in which the bending direction of the bending portion 236 of the bend stent 230A is along the bending direction of the curved shape of the lumen.

Second Embodiment

A second embodiment will be described with reference to FIGS. 32 to 36. The endoscope system according to the second embodiment differs from the endoscope system 1000 according to the first embodiment only in the stent placement step (step S6). In the following description, the same reference numerals are given to the same configurations as those already described, and redundant descriptions will be omitted.

Figure 32:
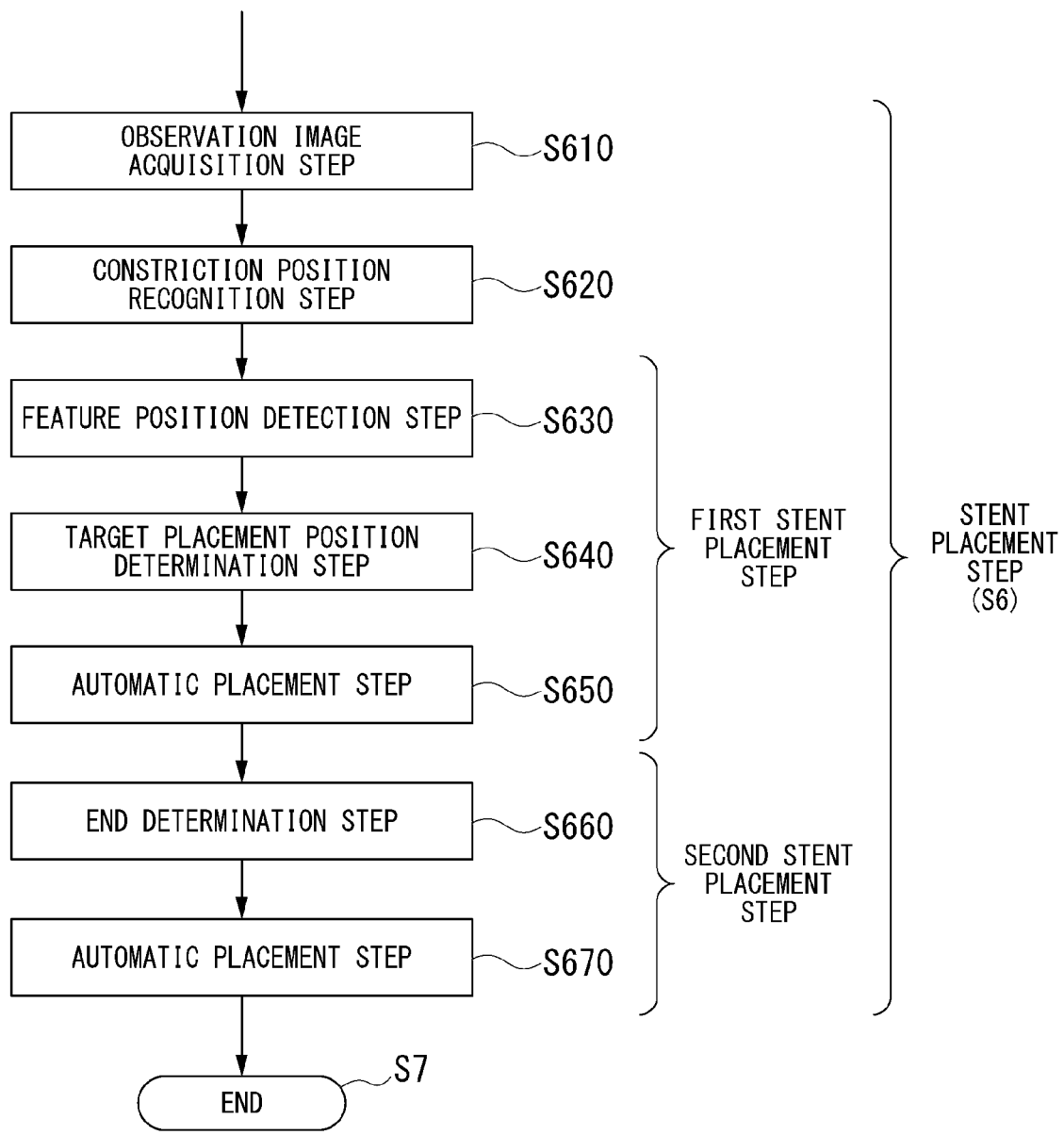
FIG. 32 is a control flowchart of the control device in the stent placement step of the endoscope system according to the second embodiment.

Hereinafter, description will be given along the control flowchart of the main controller 460 of the control device 500 in the stent placement step (step S6) shown in FIG. 32. When the control device 500 is activated, the main controller 460 starts control after performing initialization. Next, the main controller 460 (mainly processor 461) executes step S610.

Step S610: Observation Image Acquisition Step

In step S610, the main controller 460 acquires an X-ray image (observation image) showing the bile duct B and the like. The main controller 460 acquires CT images and MRI images as needed. The main controller 460 then executes step S620.

Step S620: Constriction Position Recognition Step

Figure 33:
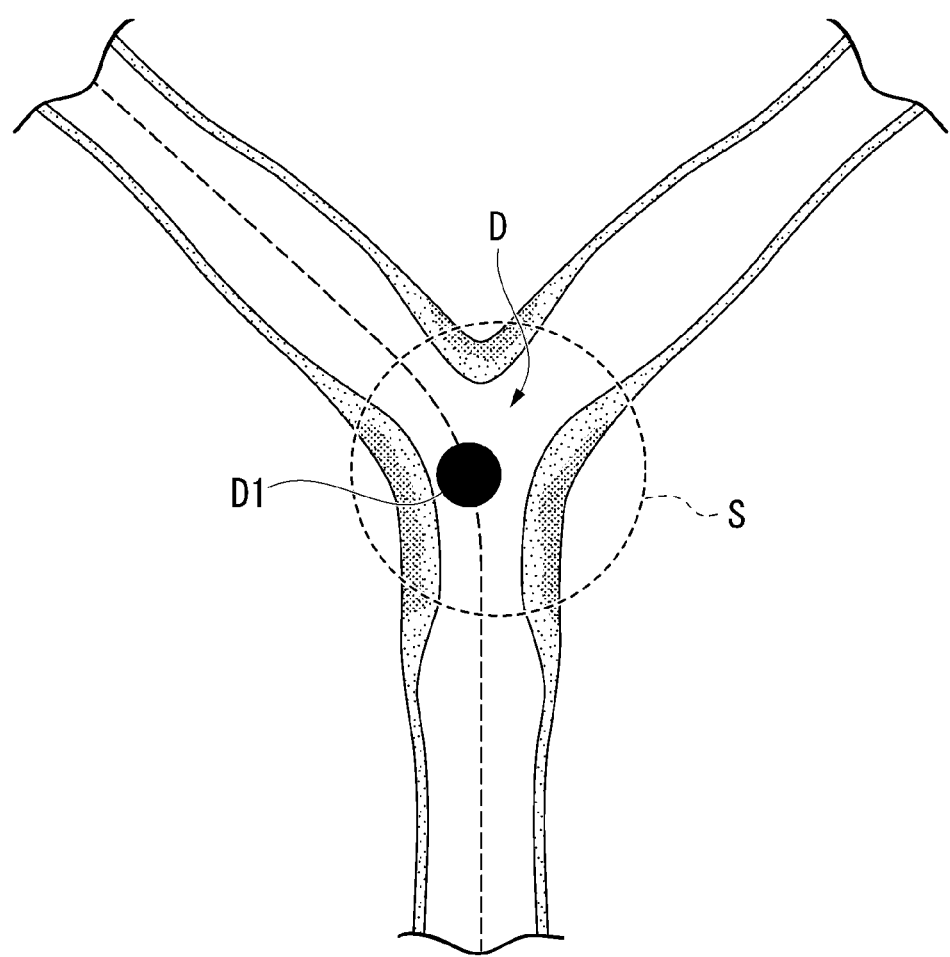
FIG. 33 is a diagram showing a stricture formed in a bile duct.

FIG. 33 is a diagram showing a stenosis S formed in the bile duct B.

The main controller 460 recognizes the position of the stenosis S based on the observed image in step S620. The stenosis S shown in FIG. 33 is formed at the bifurcation D of the bile duct B (see FIG. 22). In this case, the main controller 460 decides to use the stent-in-stent method of placing two stents at bifurcation D. In the following description, a stent having an opening 237 in the central portion used in the stent-in-stent method is referred to as a first stent 230B. In the stent-in-stent method, the stent placed through the opening of the first stent 230B is referred to as a second stent 230C. The main controller 460 then executes step S630. Here, the steps from step S630 to step S650 are the first stent placement step.

Step S630: Feature Position Detection Step

Figure 34:
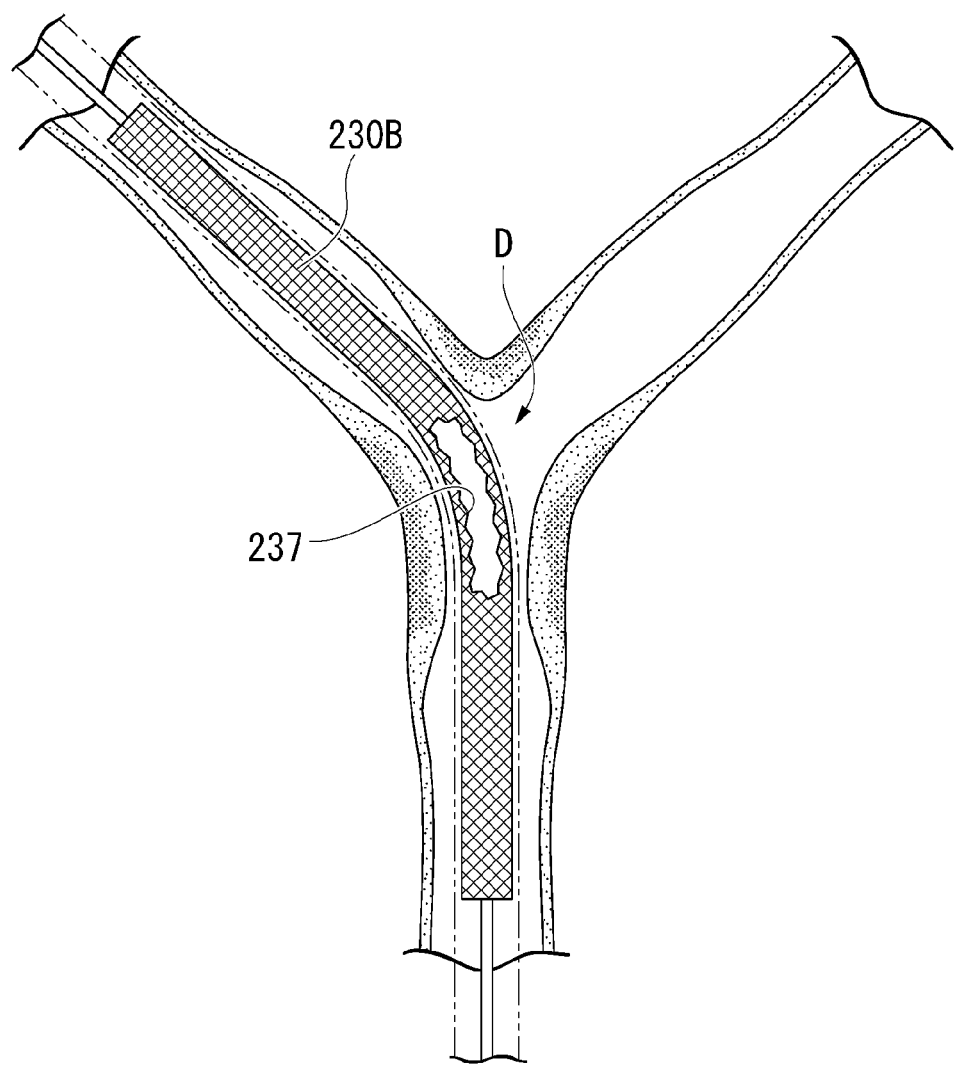
FIG. 34 is a diagram for explaining a feature position detection step.

FIG. 34 is a diagram explaining the feature position detection step.

At step S630, the main controller 460 detects the feature position FP of the first stent 230B based on the observed image. The feature position FP of the first stent 230B is the "partial position of the first stent 230B" the placement of which should be considered when placing the stent 230, and is the "position of the opening 237" in this embodiment. The main controller 460 detects the position of the opening 237 (feature position FP) by the same method as in the first embodiment. The main controller 460 then executes step S640.

Step S640: Target Placement Position Determination Step

In step S640, the main controller 460 determines the "target placement position TP" for placing the first stent 230B in the stenosis S based on the observed image and the feature position FP.

The main controller 460 determines the target placement position TP of the first stent 230B at which the feature position FP is placed at the optimum position. In this embodiment, the target placement position TP is the position of the first stent 230B arranged at the position (optimal position) where the opening 237 (feature position FP) faces the branched duct through which the second stent 230C is inserted. Specifically, the target advance/retract position TP1 is the position of the first stent 230B where the opening 237 of the first stent 230B is arranged at substantially the same position in the longitudinal direction A as the branch position D1 of the lumen. The target rotational position TP2 is the position of the first stent 230B in which the opening 237 of the first stent 230B faces in the circumferential direction C the bifurcated duct through which the second stent 230C is inserted.

After determining the target placement position TP of the first stent 230B, the main controller 460 executes step S650.

Step S650: Automatic Placement Step

In step S650, the main controller 460 drives the delivery device driving device 370 and operates the operation portion 240 of the stent delivery device 200 to automatically place the first stent 230B at the target placement position TP.

Figure 35:
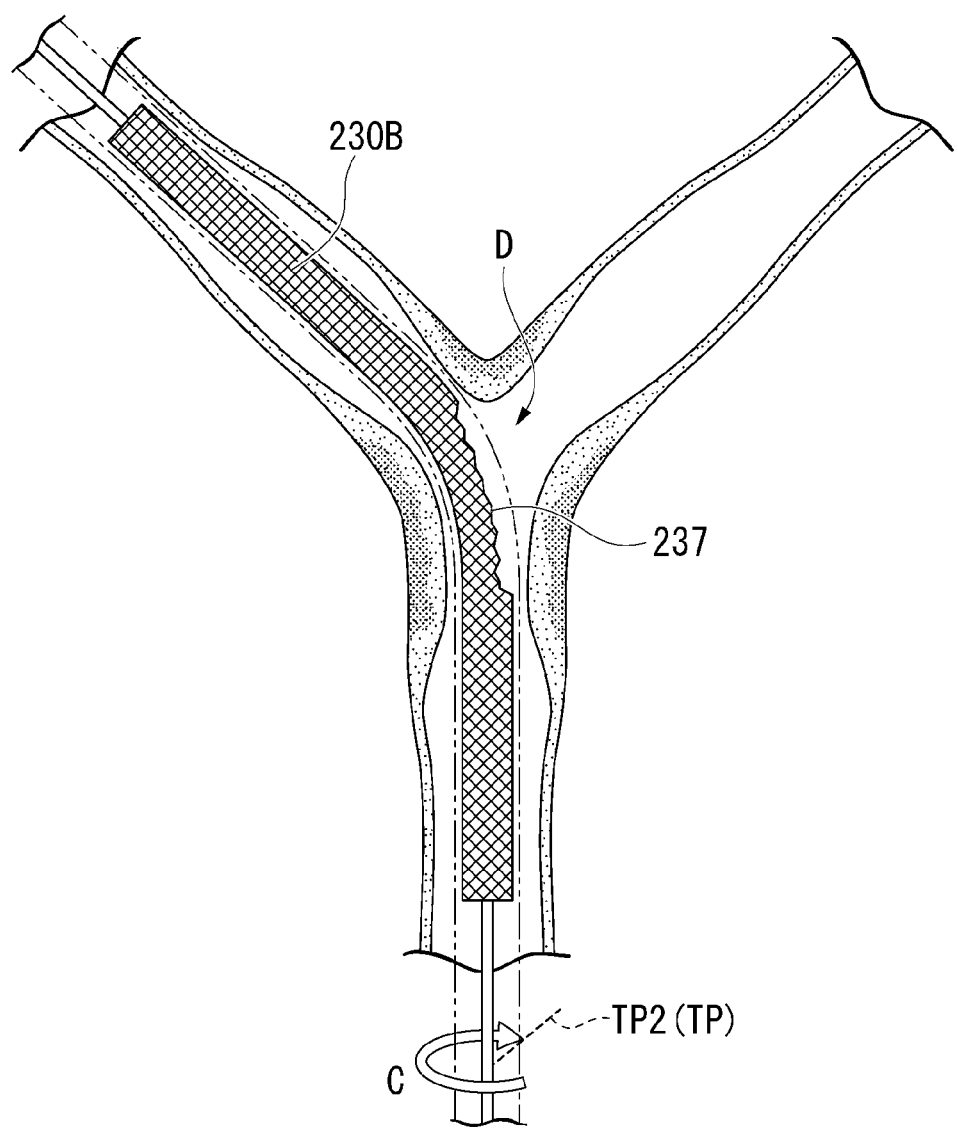
FIG. 35 is a diagram showing a first stent rotated during the automatic placement step.

FIG. 35 is a diagram showing the first stent 230B rotated during the automatic placement step.

The main controller 460 rotates the inner cylinder operating portion 242 and the inner cylinder member 220 in the circumferential direction C by driving the inner cylinder driving portion 375 of the delivery device driving device 370 until the first stent 230B substantially coincides with the target rotational position TP2. Note that the main controller 460 may simultaneously drive the outer cylinder driving portion 372 and the inner cylinder driving portion 375 to simultaneously rotate the outer cylinder member 210 and the inner cylinder member 220.

After the first stent 230B is placed at the target placement position TP (the target advance/retract position TP1 and the target rotational position TP2), the main controller 460 drives the delivery device driving device 370 to release and place the first stent 230B. The delivery device driving device 370 exposes the first stent 230B accommodated by moving the outer tube operation portion 241 to the proximal side A2 with respect to the inner tube operation portion 242, and deploys the first stent 230B. As a result, the first stent 230B is left in a state where the opening 237 (feature position FP) faces the branched duct through which the second stent 230C is inserted (optimal position).

The operator inserts the stent delivery device 200 containing the second stent 230C into the treatment instrument channel 130 of the endoscope 100. The main controller 460 then executes step S660. Here, the steps from step S660 to step S670 are the second stent placement step.

Step S660: Target Placement Position Determination Step

In step S660, the main controller 460 determines the "target placement position TP" for placing the second stent 230C in the stenosis S based on the observed image and the feature position FP. Specifically, the target advance/retract position TP1 is the position of the second stent 230C where the center position of the second stent 230C is arranged at substantially the same position in the longitudinal direction A as the branch position D1 of the lumen. Since the second stent 230C does not particularly have a feature position FP such as an opening, the target placement position TP does not have to include the target rotational position TP2. The main controller 460 then executes step S670.

Step S670: Automatic Placement Step

In step S670, the main controller 460 drives the delivery device driving device 370 and operates the operation portion 240 of the stent delivery device 200 to automatically place the second stent 230C at the target placement position TP.

Figure 36:
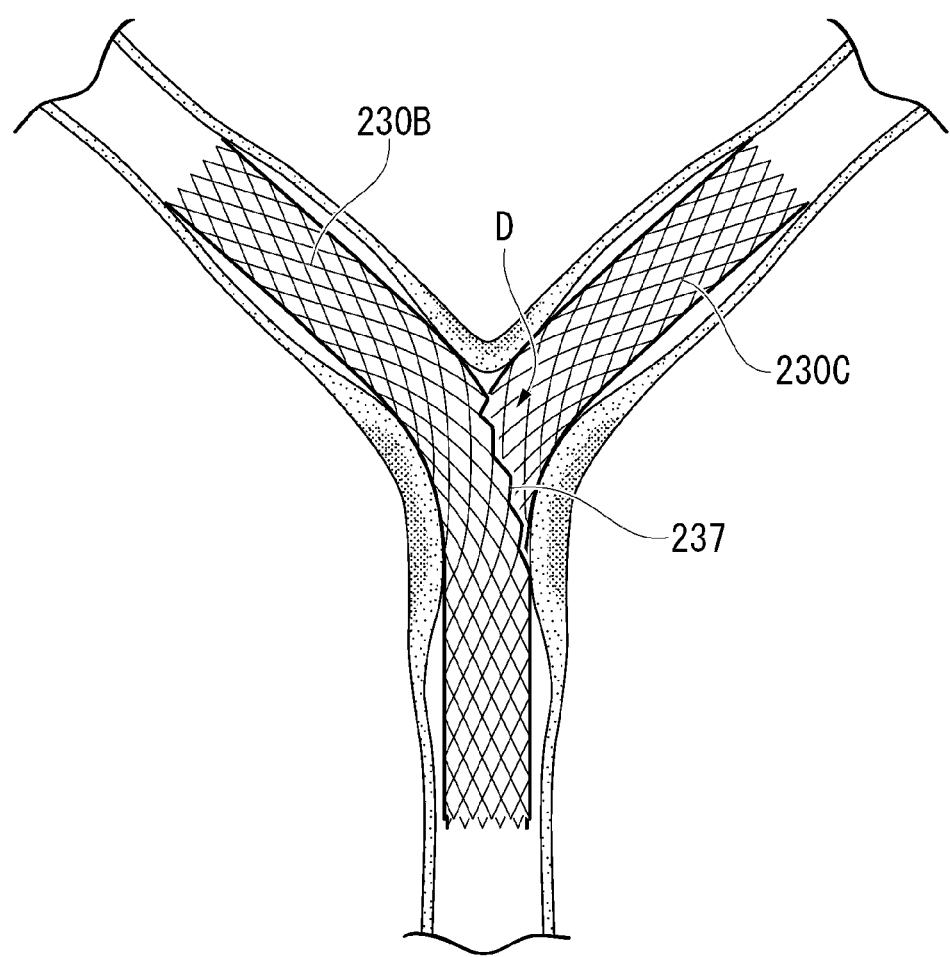
FIG. 36 is a diagram showing a second stent placed in the automatic placement step.

FIG. 36 is a diagram showing the second stent 230C placed in the automatic placement step.

The second stent 230C is placed along the branched duct through the opening 237 of the first stent 230B.

When the main controller 460 completes the automatic placement of the first stent 230B and the second stent 230C, or receives an input from the operator to suspend the automatic placement of the first stent 230B and the second stent 230C, the main controller 460 terminates control of the stent placement step (step S6). The operator pulls out the stent delivery device 200 except for the first stent 230B and the second stent 230C.

According to the endoscope system (stent delivery system) of this embodiment, it is easy to place the stent at the target position. By the endoscope system (stent delivery system) of the present embodiment, even if the user does not input the target placement position TP (target advance/retract position TP1 and target rotational position TP2) of the first stent 230B, it is possible to estimate the target placement position TP of the first stent 230B, and advance/retract the first stent 230B to the target placement position TP or rotate the first stent 230B.

As described above, the second embodiment of the present disclosure has been described in detail with reference to the drawings, but the specific configuration is not limited to this embodiment, and design changes etc. within the scope of the present disclosure are included. Also, the constituent elements shown in the second embodiment described above and the modifications shown below can be combined as appropriate.

APPENDIX

A stent delivery system, comprising:
a stent delivery device configured to carry a stent to a stenosis and indwell the stent;
an observation device configured to observe the stenosis;
one or more controllers being configured to:
  acquire an observation image from the observation device; and
  detect a feature position of the stent based on the observation image, and
  determine a target placement position, which is a position for placing the stent in the stenosis, based on the observation image and the feature position.

The stent delivery system according to the above, wherein the one or more controllers being configured to control the driving device to place the stent at the determined target placement position.

The stent delivery system according to the above, wherein the one or more controllers being configured to control the driving device to rotate the stent in a circumferential direction so that the stent is placed at the determined target placement position.

The stent delivery system according to the above, wherein
the detected feature position is a cover provided on a part of the stent in the circumferential direction, and
the determined target placement position is a position of the stent where the cover is placed in a position facing an affected area formed in the stenosis.

The stent delivery system according to the above, wherein
the detected feature position is a bending portion with a curvature provided on the stent, and
the determined target placement position is a position of the stent where the bending portion is positioned along a curved shape of a lumen.

The stent delivery system according to the above, wherein
the detected feature position is an opening provided in a part of the stent in the circumferential direction, and
the determined target placement position is a position of the stent placed at a position where the opening faces a branched duct.

The stent delivery system according to the above, wherein the determining of the target placement position comprises determining a target advance/retract position, which is a position in a longitudinal direction where the stent is placed, and determining a target rotational position, which is a position in the circumferential direction where the stent is placed.

The stent delivery system according to the above, wherein the one or more controllers being configured to control the driving device to move the stent delivery device forward and backward in the longitudinal direction until the stent substantially coincides with the target advance/retract position.

The stent delivery system according to the above, wherein the one or more controllers being configured to control the driving device to rotate at least a portion of the stent delivery device having the stent in the circumferential direction until the stent substantially coincides with the determined target rotational position.

The stent delivery system according to the above, wherein
the observation device is an X-ray fluoroscopy device, and
the observation image is an X-ray image.

A stent delivery method for placing a stent with a stent delivery device, the method comprising:
detecting a feature position of the stent based on an observation image acquired from an observation device for observing a stenosis;
determining a target placement position, which is a position for placing the stent in the stenosis, based on the observation image and the detected feature position.

The stent delivery method according to the above, further comprising:
controlling a driving device that drives the stent delivery device to place the stent at the determined target placement position.

The stent delivery method according to the above, wherein the controlling comprises rotating the stent in the circumferential direction by controlling the driving device so that the stent is placed at the determined target placement position.

The stent delivery method according to the above, wherein
the detected feature position is a cover provided on a part of the stent in the circumferential direction, and
the determined target placement position is a position of the stent where the cover is placed in a position facing an affected area formed in the stenosis.

The stent delivery method according to the above, wherein the detected feature position is a bending portion with a curvature provided on the stent, and
the determined target placement position is a position of the stent where the bending portion is positioned along a curved shape of a lumen.

The stent delivery method according to the above, wherein
the detected feature position is an opening provided in a part of the stent in the circumferential direction, and
the determined target placement position is a position of the stent placed at a position where the opening faces a branched duct.

The stent delivery method according to the above, wherein the determining of the target placement position determines a target advance/retract position, which is a position in the longitudinal direction where the stent is placed, and determines a target rotational position, which is a position in the circumferential direction where the stent is placed.

The stent delivery method according to the above, further comprising:
controlling a driving device for driving the stent delivery device to move the stent delivery device forward and backward in the longitudinal direction until the stent substantially coincides with the determined target advance/retract position;

The stent delivery method according to the above, further comprising:
controlling a driving device for driving the stent delivery device to rotate at least a portion of the stent delivery device having the stent in the circumferential direction until the stent substantially coincides with the determined target rotational position.

The stent delivery method according to the above, wherein
the observation device is an X-ray fluoroscopy device, and
the observation image is an X-ray image.

What is claimed is:

1. A stent delivery system, comprising:
a stent delivery device configured to carry a stent to a stenosis and indwell the stent;
an observation device configured to observe the stenosis; and
one or more processors comprising hardware, the one or more processors being configured to:
acquire an observation image from the observation device; and
determine at least one stent candidate to be placed in the stenosis using a model in which the observation image is input and a degree of fittabilty calculated from a degree of similarity for a stent type is output, wherein:
the model includes a database in which characteristics of the stenosis and the stent type of the stent which has been used are associated with each medical case; and
the model calculates a degree of similarity with cases registered in the database based on the characteristics of the stenosis extracted from the observation image.

2. The stent delivery system according to claim 1, wherein the one or more processors being configured to determine at least one stent candidate using the model in which preoperative information and the observation image are input and the degree of fittabilty for the stent type is output.

3. The stent delivery system according to claim 2, wherein the model includes a database in which the characteristics of the stenosis and the stent type of the stent which has been used are associated with each medical case, and the model calculates a degree of similarity with cases registered in the database based on the characteristics of the stenosis extracted from the observation image, and outputs the degree of fittabilty for the stent type calculated from the degree of similarity.

4. The stent delivery system according to claim 3, wherein the one or more processors being configured to calculate the degree of fittabilty based on a number of similar cases, which is the number of cases whose degree of similarity is higher than a predetermined threshold among the cases registered in the database.

5. The stent delivery system according to claim 4, further comprising:
a display, wherein the one or more processors being configured to control the display to display the determined stent candidate which has been determined together with the number of similar cases.

6. The stent delivery system according to claim 4, further comprising:
a display, wherein the one or more processors being configured to control the display to display the determined stent candidate which has been determined together with a ratio of the number of similar cases.

7. The stent delivery system according to claim 1, wherein the one or more processors being configured to determine the stent type with a highest degree of fittabilty.

8. The stent delivery system according to claim 7, further comprising:
a display, wherein the one or more processors being configured to control the display to display the determined stent candidate which has been determined together with the degree of fittabilty.

9. The stent delivery system according to claim 1, wherein the characteristics of the stenosis comprises a position of the stenosis.

10. The stent delivery system according to claim 1, wherein the characteristics of the stenosis comprises a shape of the stenosis.

11. The stent delivery system according to claim 1, wherein the stent type is a type of stent classified by material.

12. The stent delivery system according to claim 1, wherein the stent type is a type of stent classified by shape.

13. The stent delivery system according to claim 1, wherein the observation device is an X-ray fluoroscopy device, and the observation image is an X-ray image.

14. A control apparatus comprising:
one or more processors comprising hardware, the one or more processors being configured to:
acquire an observation image from an observation device that observes a stenosis; and
determine at least one stent candidate to be placed in the stenosis using a model in which the observation image is input and a degree of fittabilty calculated from a degree of similarity for a stent type is output, wherein:
the model includes a database in which characteristics of the stenosis and the stent type of the stent which has been used are associated with each medical case; and
the model calculates a degree of similarity with cases registered in the database based on the characteristics of the stenosis extracted from the observation image.

15. The control apparatus according to claim 14, wherein the one or more processors being configured to determine at least one stent candidate using the model that takes the observation image as input and a degree of fittabilty for a stent type as output.

16. A method comprising:
acquiring an observation image from an observation device that observes a stenosis; and
determining at least one stent candidate to be placed in the stenosis using a model in which the observation image is input and a degree of fittabilty calculated from a degree of similarity for a stent type is output, wherein:
the model includes a database in which characteristics of the stenosis and the stent type of the stent which has been used are associated with each medical case; and
the model calculates a degree of similarity with cases registered in the database based on the characteristics of the stenosis extracted from the observation image.

17. The method according to claim 16, further comprising:
judging at least one stent candidate using the model that takes the observation image as input and the degree of fittabilty for a stent type as output.

* * * * *